(12) United States Patent
Tanaka

(10) Patent No.: US 7,239,440 B2
(45) Date of Patent: Jul. 3, 2007

(54) WAVELENGTH CONVERSION APPARATUS

(75) Inventor: Masato Tanaka, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 326 days.

(21) Appl. No.: 10/991,082

(22) Filed: Nov. 18, 2004

(65) Prior Publication Data

US 2005/0111499 A1 May 26, 2005

Related U.S. Application Data

(60) Provisional application No. 60/572,115, filed on May 19, 2004, provisional application No. 60/570,470, filed on May 13, 2004.

(30) Foreign Application Priority Data

Nov. 18, 2003 (JP) ............ P2003-388109

(51) Int. Cl.
*G02F 1/35* (2006.01)
*G02F 2/02* (2006.01)
(52) U.S. Cl. .................... 359/326; 359/330
(58) Field of Classification Search ........ 359/326–332
See application file for complete search history.

(56) References Cited

U.S. PATENT DOCUMENTS 6,023,360 A * 2/2000 Morioka et al. ............ 398/1
7,054,057 B2 * 5/2006 Aso et al. ............... 359/326
2001/0007509 A1 * 7/2001 Aso et al. ............... 359/326
2003/0048503 A1 * 3/2003 Aso et al. ............... 359/124
2006/0193032 A1 * 8/2006 Aso et al. ............... 359/330

FOREIGN PATENT DOCUMENTS

JP 10-133240 5/1998
JP 2000-081643 3/2000

OTHER PUBLICATIONS

Kawanishi et al, "All-Optical Time Division Multiplexing Using Four-Wave Mixing", Electronics Letters, vol. 30, No. 20, Sep. 29, 1994, pp. 1697-1698.*

(Continued)

*Primary Examiner*—Hemang Sanghavi
(74) *Attorney, Agent, or Firm*—McDermott Will & Emery LLP

(57) ABSTRACT

The present invention relates a wavelength conversion apparatus capable of making the wavelength of output light constant even when the wavelength of input light is changed. The wavelength conversion apparatus comprises a first wavelength converter and a second wavelength converter which are provided in series between an input terminal and an output terminal. The first wavelength converter generates four-wave mixing by input light and a first pumping light, generates an intermediate light having a new wavelength by the four-wave mixing, and outputs the intermediate light and the input light. The second wavelength converter generates four-wave mixing by the intermediate light and the input light, respectively outputted from the first wavelength converter, and a second pumping light, generates output light having a new wavelength by the four-wave mixing, and outputs the generated output light.

20 Claims, 27 Drawing Sheets

OTHER PUBLICATIONS

Tomooka et al, "The Generation Of Powerful Rainbow-Color Laser Emission By Four-Wave Raman Mixing For Display And Illumination", J. Light & Vis. Env. (The Illuminating Engineering Institute Of Japan), vol. 22, No. 2, 1998, pp. 1-5.*

Sotobayashi, H., et al., "40 Gbit/s photonic packet compression and decompression by supercontinuum generation", Electronic Letters, Jan. 18, 2001, vol. 37, No. 2.

Lacey, J.P.R., et al., "All-optical WDM to TDM transmultiplexer", Electronic Letters Sep. 15, 1994, vol. 30, No. 19.

Tanaka, M., et al., "10Gbit's directly modulated signal transmission over 80km SMF with chirp compensation using four-wave mixing", 2004 Conference on Lasers and Electro-Optics / International Quantum Electronics Conference CThG1.

Suzuki N. et al., "Simultaneous Compensation of Laser Chirp, Kerr Effect, and Dispersion in 10-Gb/s Long-Haul Transmission Systems" Journal of Lightwave Technology, vol. 11, No. 9, Sep. 1993.

Tatham, M., et al., "Transmission of 10 Gbit/s directly modulated DFB signals over 200 km standard fibre using mid-span spectral inversion", Electronic Letters, Aug. 4, 1994, vol. 30, No. 16.

* cited by examiner

Fig.4

|  | LENGTH (km) | LOSS (dB/km) | DISPERSION (ps/nm/km) | DISPERSION SLOPE (ps/nm²/km) | EFFECTIVE AREA (μm²) |
|---|---|---|---|---|---|
| HNL-DSL1 | 0.5 | 0.53 | -0.02 | 0.03 | 11.0 |
| HNL-DSL2 | 1.0 | 0.57 | 0.03 | 0.03 | 10.5 |

Fig.5
(a)
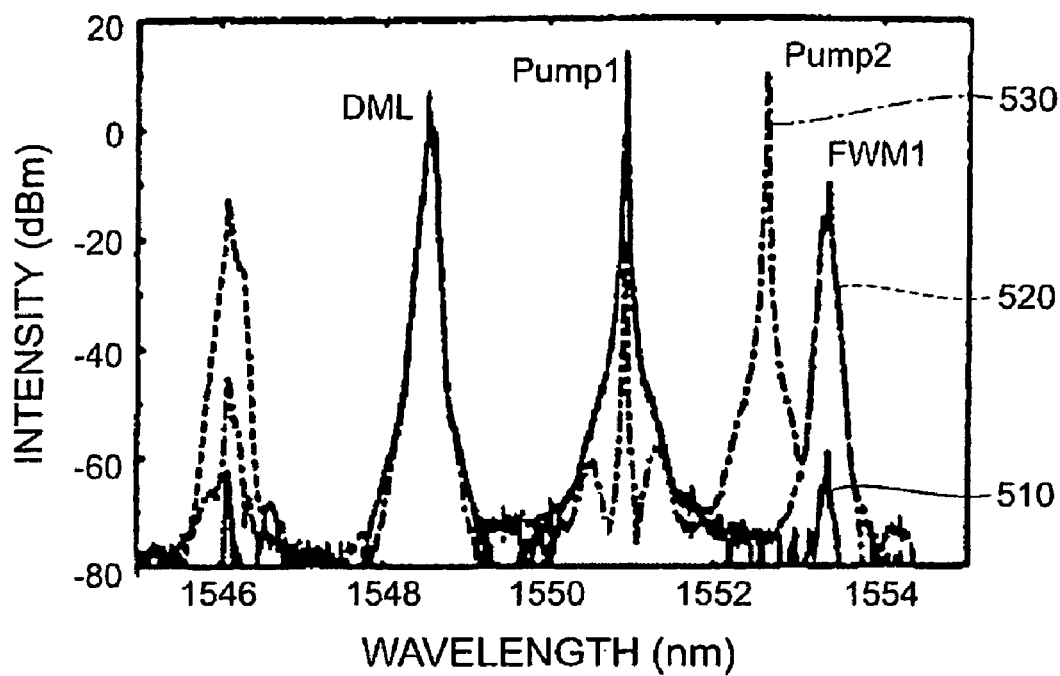
(b)
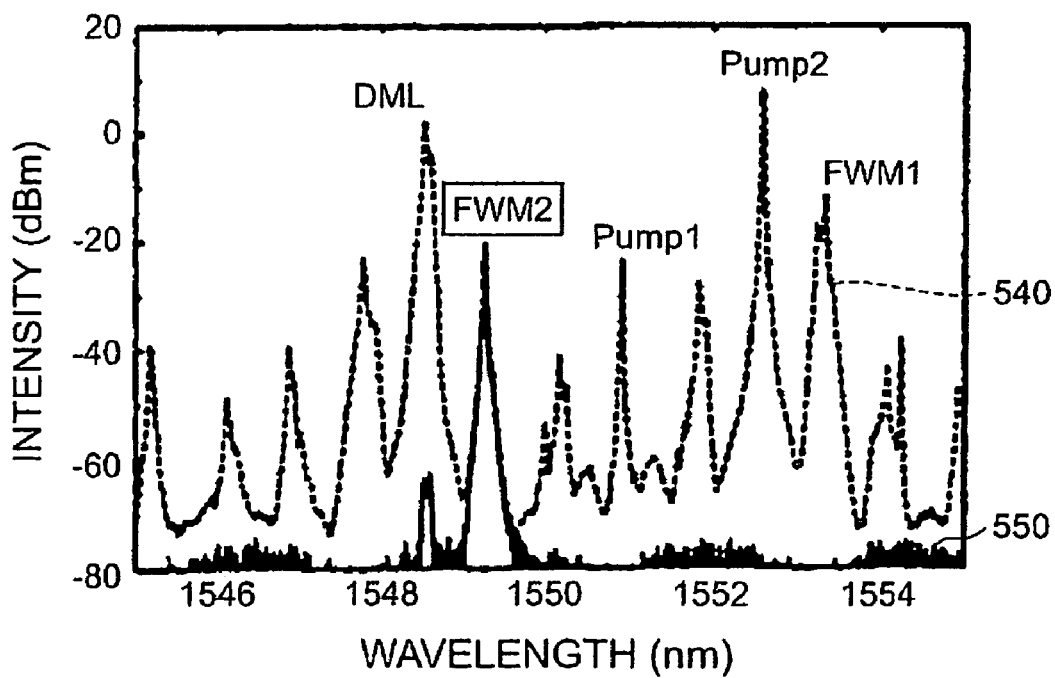

Fig.7
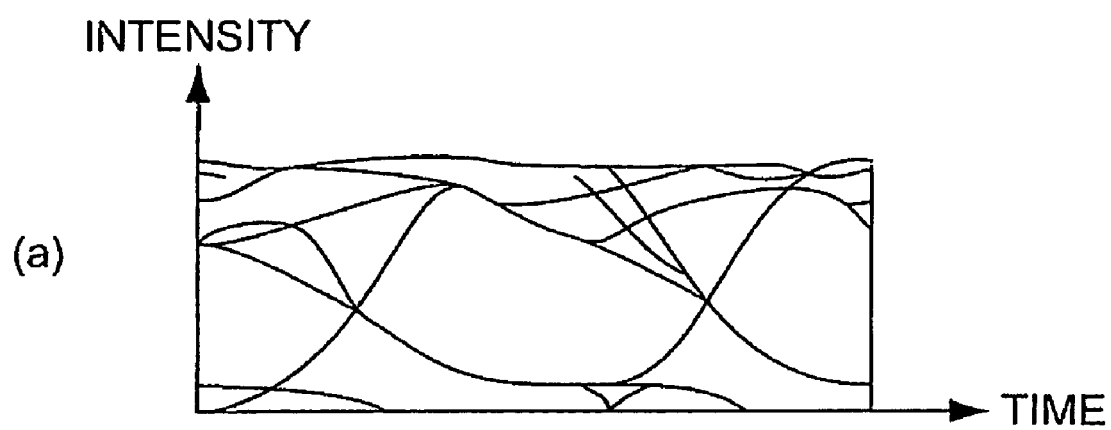
(a)
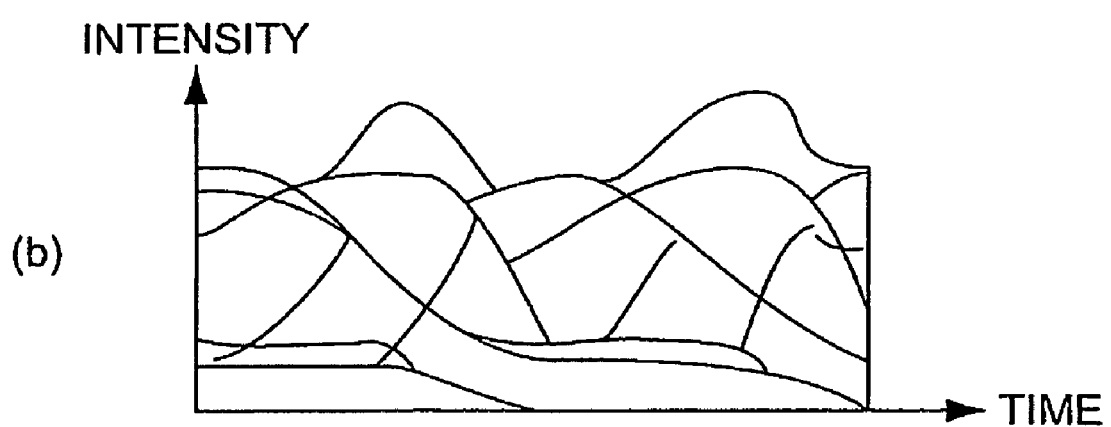
(b)

Fig.9
(a)
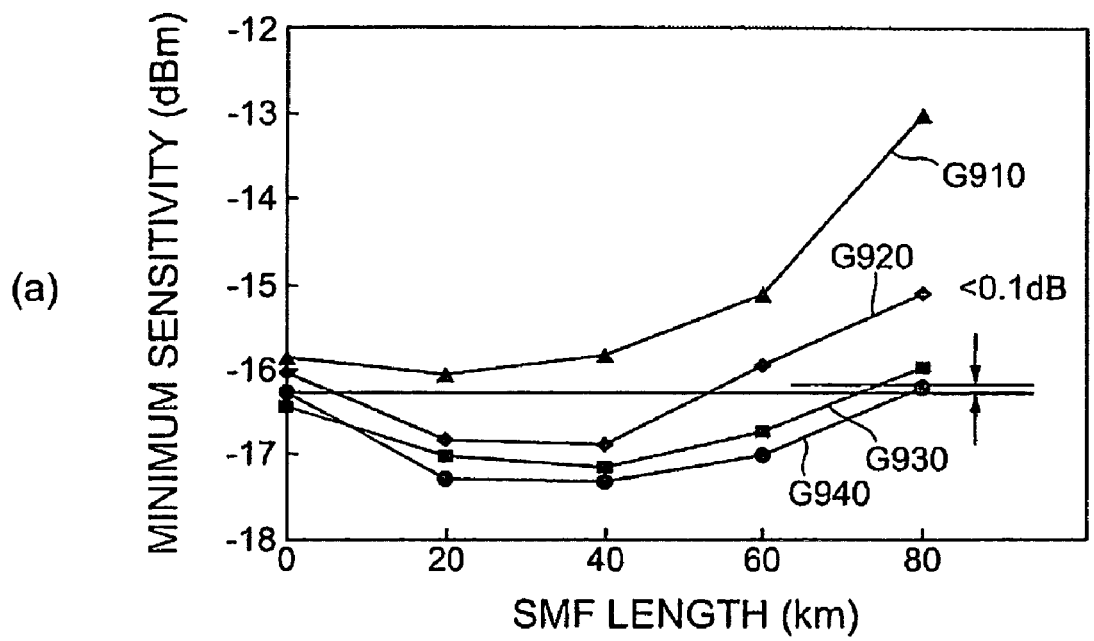
(b)
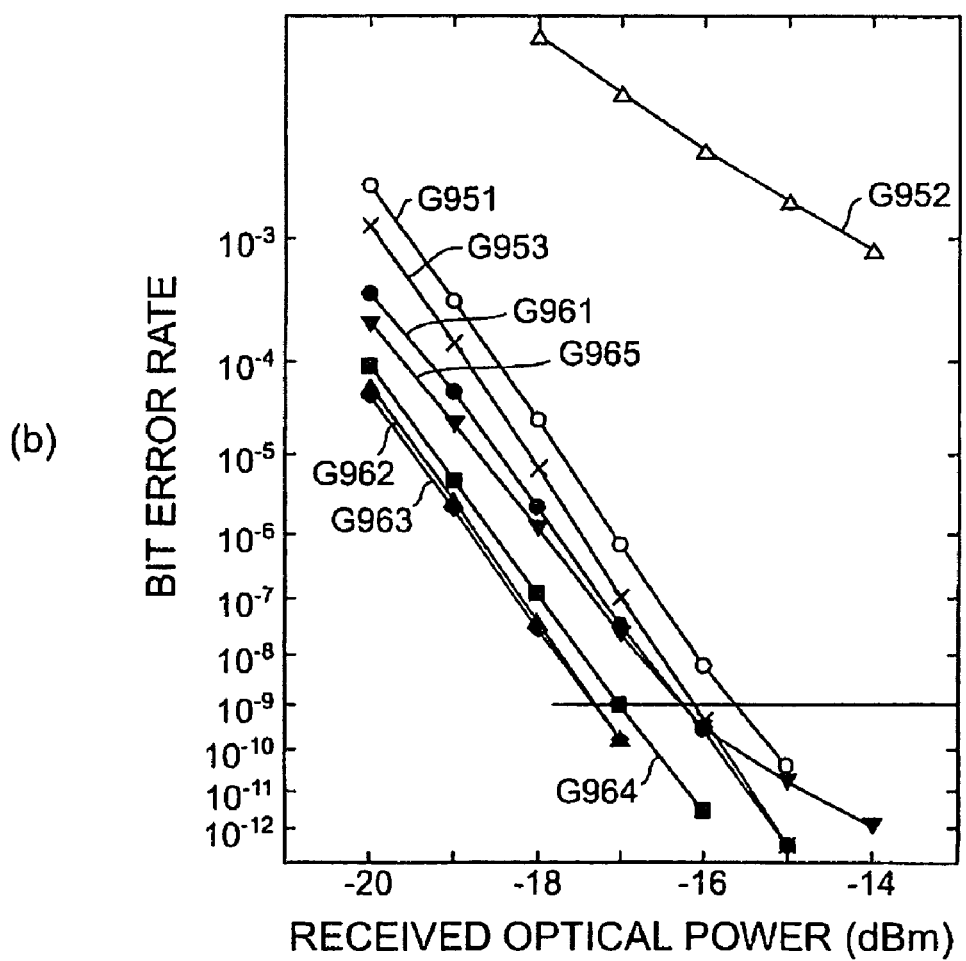

Fig.12
(a)
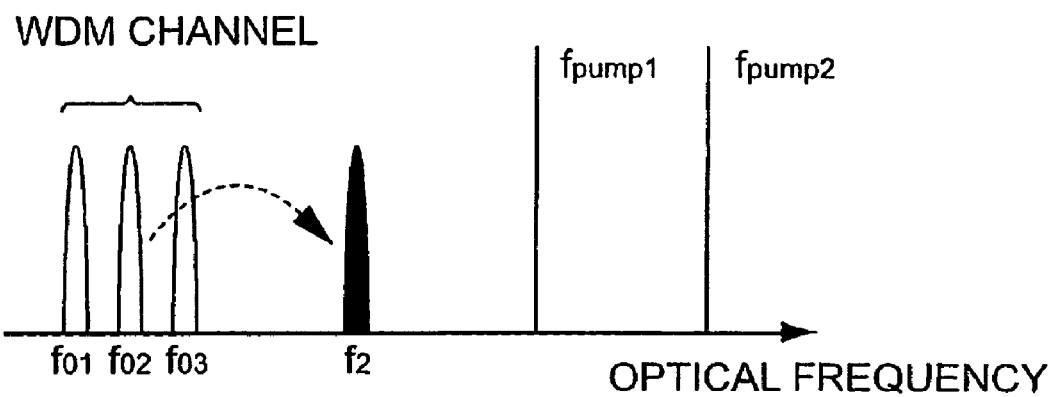
(b)
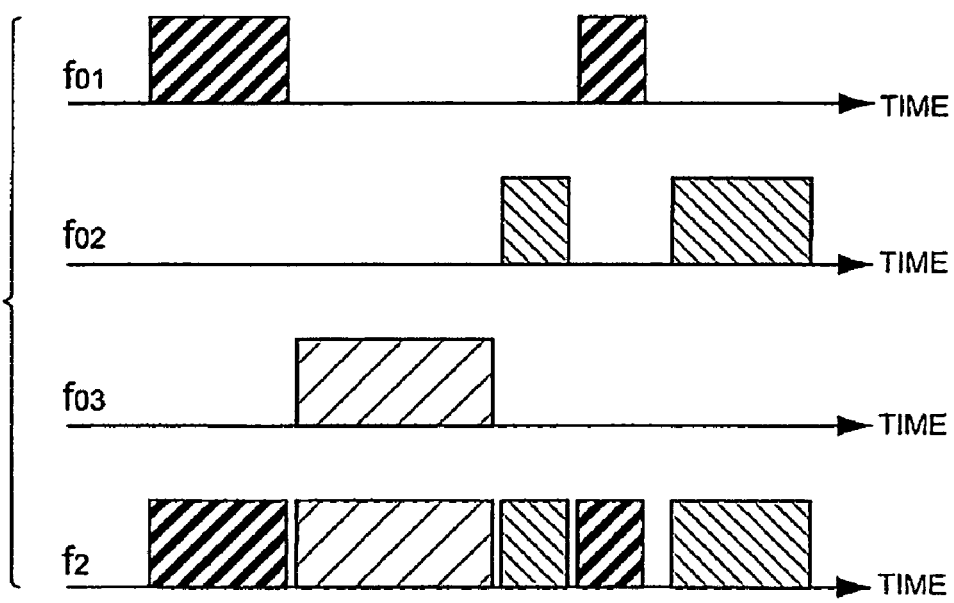

Fig.13
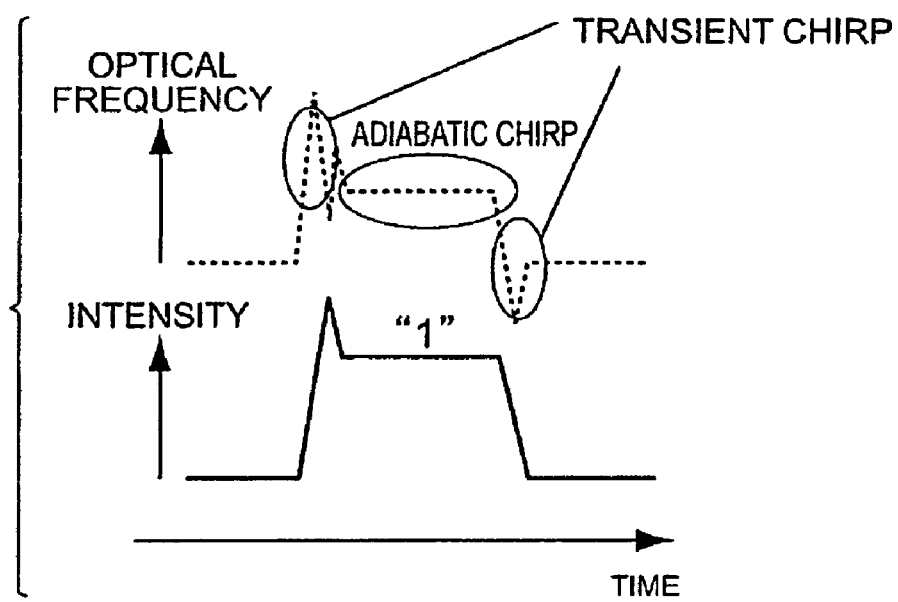
(a)
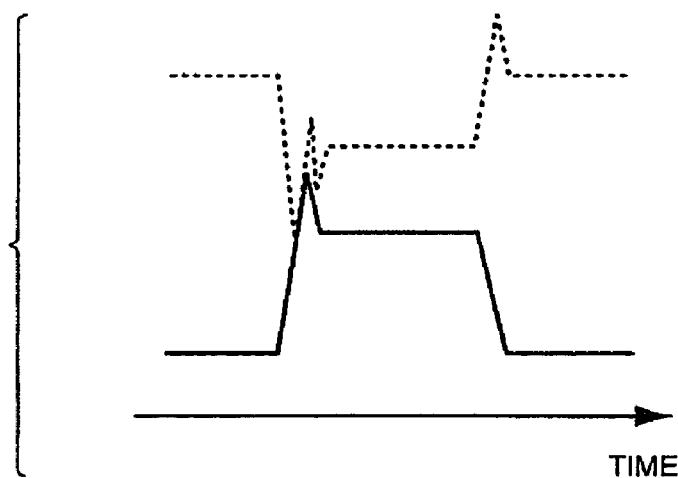
(b)
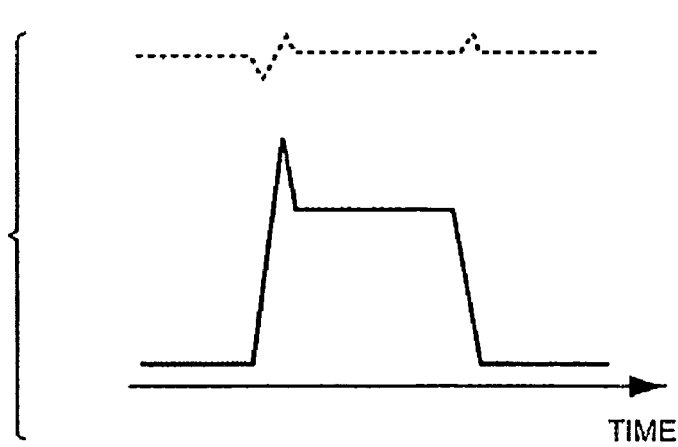
(c)

Fig.15
(a)
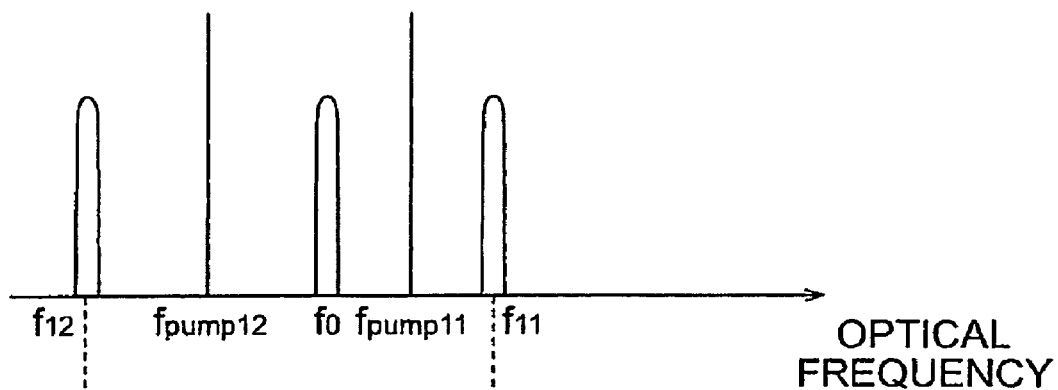
(b)
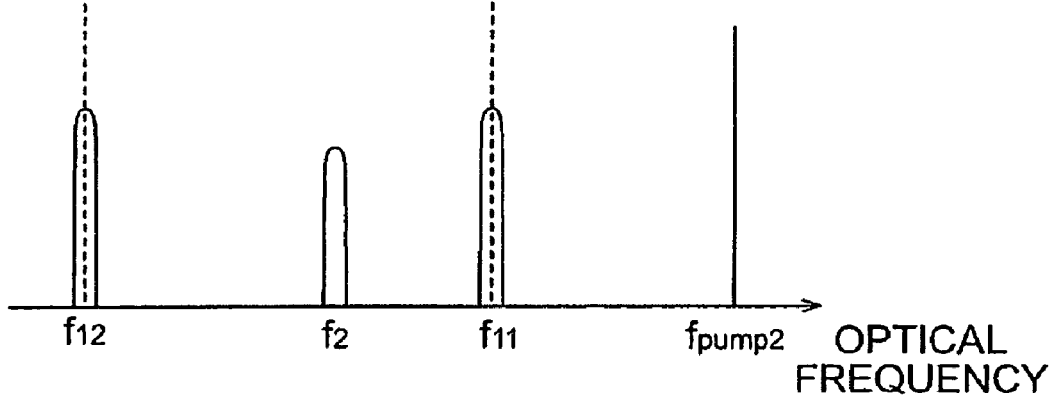

Fig.17
(a)
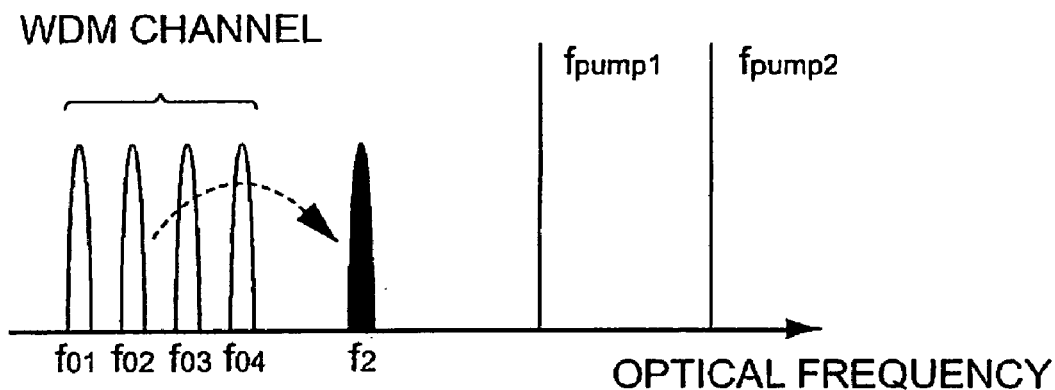
(b)
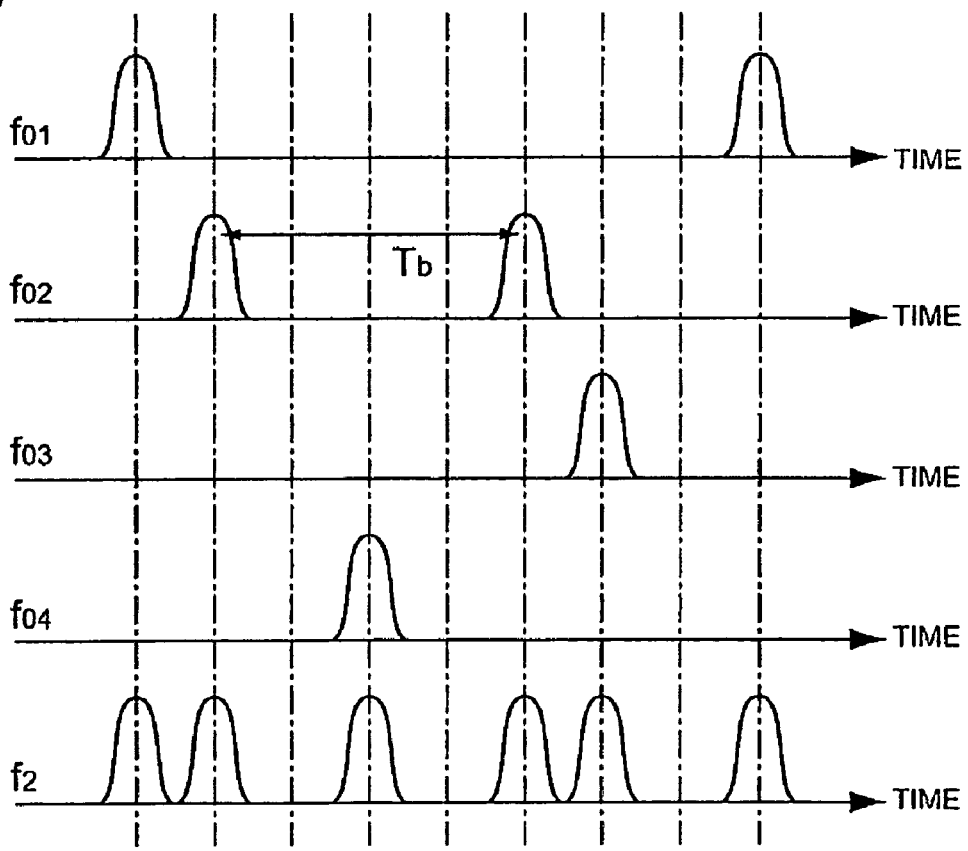

Fig.23
(a)
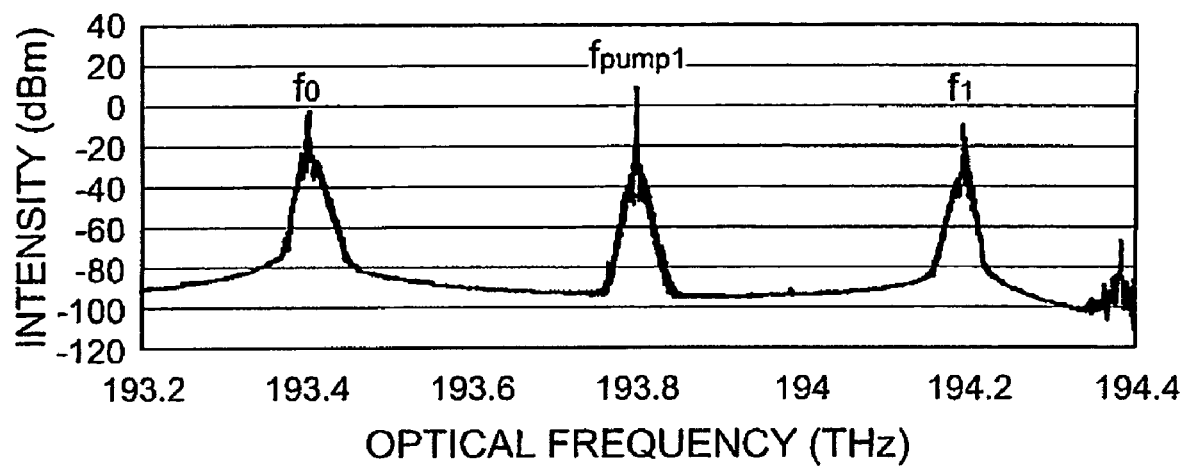
(b)
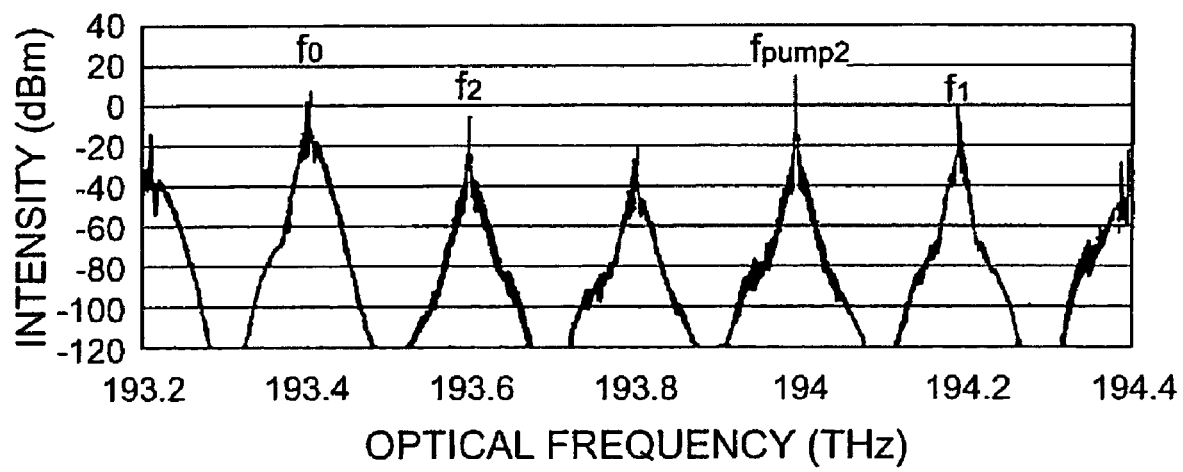

Fig.24
(a)
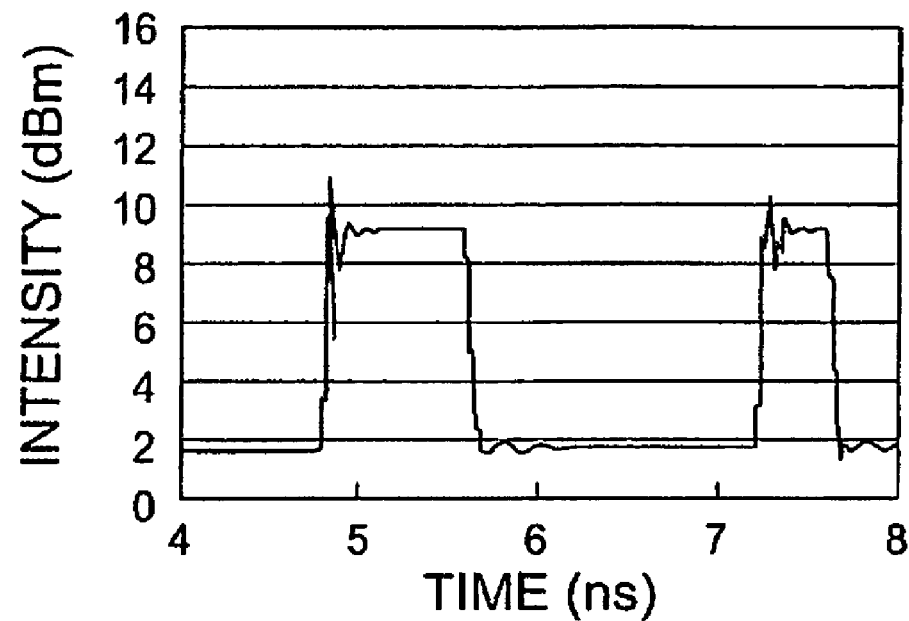
(b)
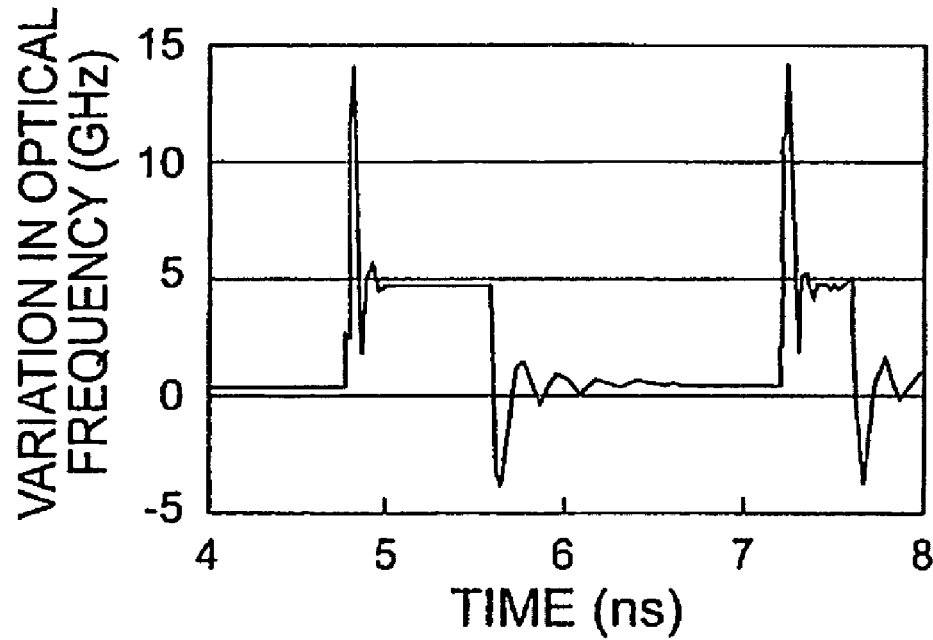

Fig.25
(a)
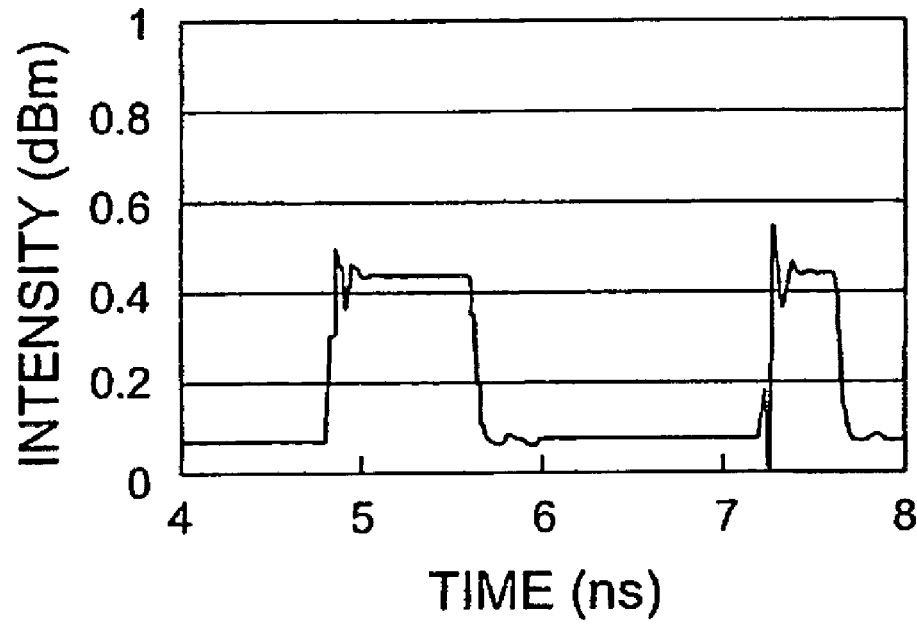
(b)
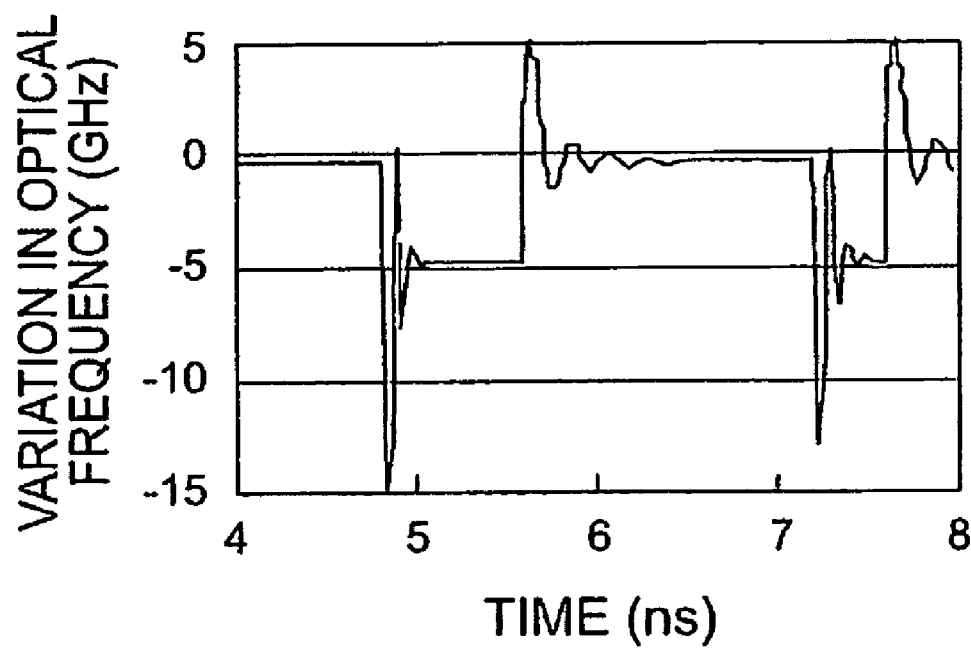

Fig. 26
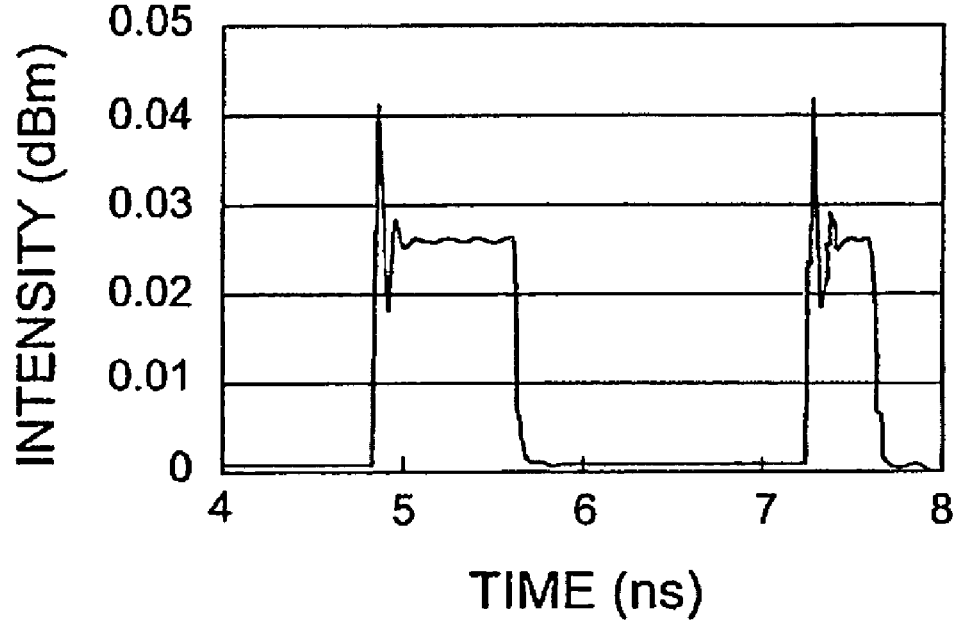
(a)
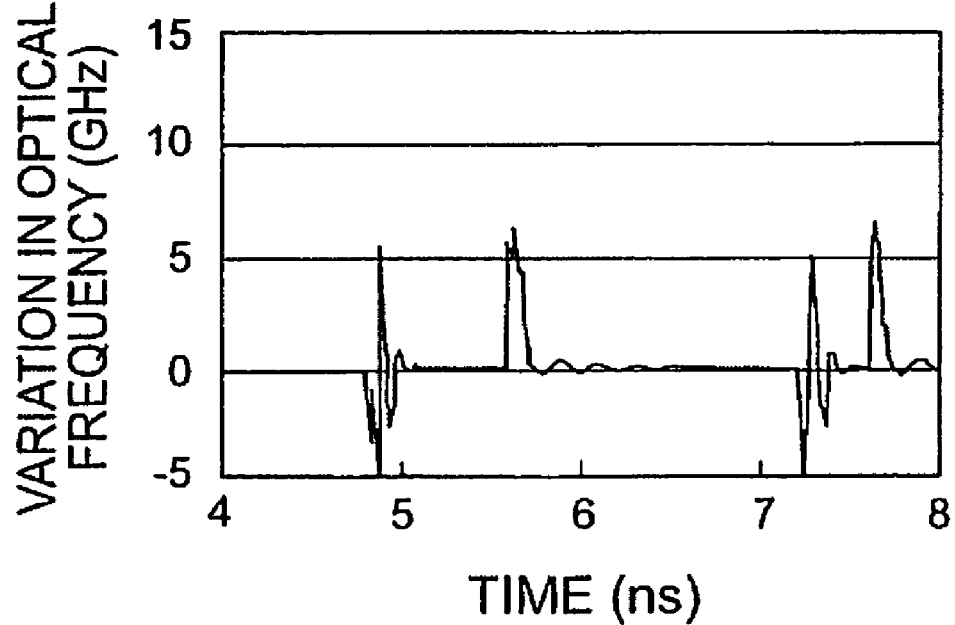
(b)

Fig.27
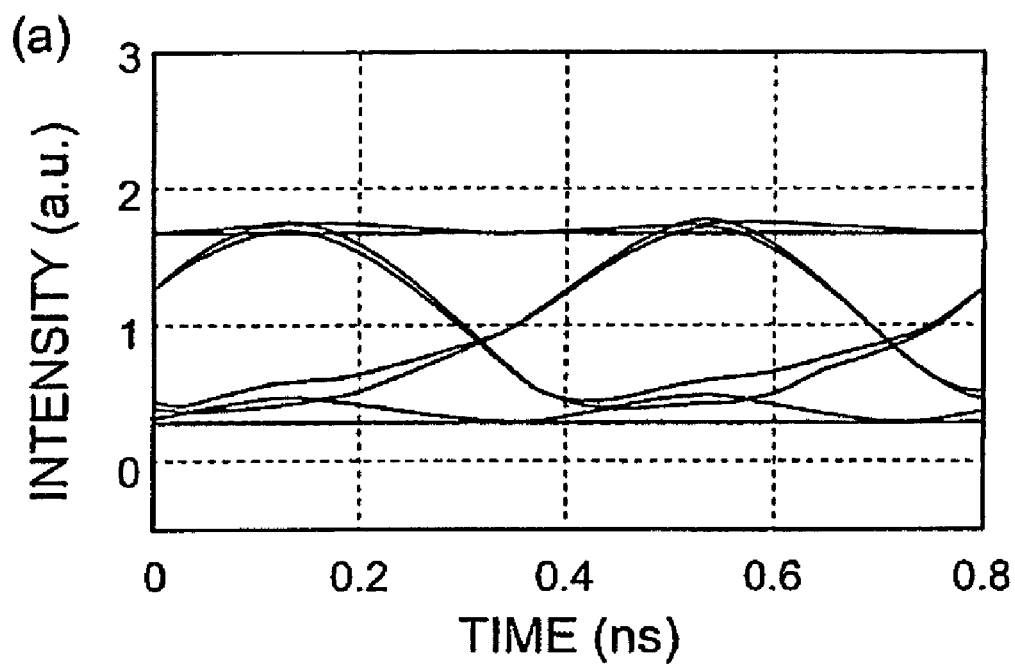
(a)
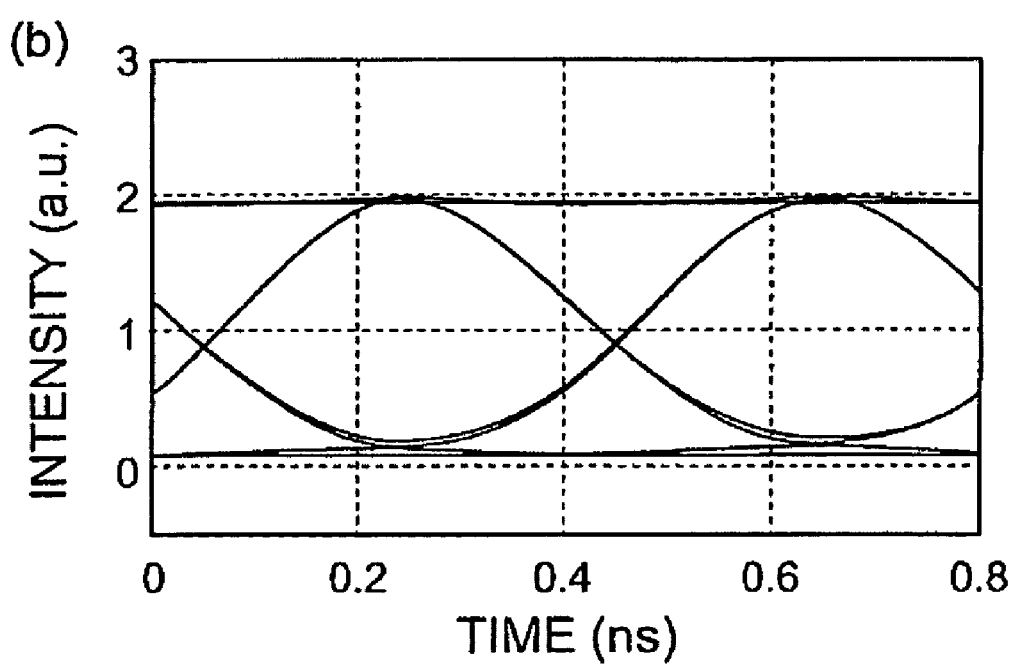
(b)

WAVELENGTH CONVERSION APPARATUS

CROSS-REFERENCE TO RELATED APPLICATION

This application claims priority to Provisional Applications 60/570,470 and 60/572,115, filed on May 13, 2004 and May 19, 2004, which are hereby incorporated by reference in its entirety.

BACKGROUND OF THE INVENTION

1. Field of the Invention

The present invention relates to a wavelength conversion apparatus for generating output light having a wavelength different from the wavelength of input light and outputting the generated output light, and an optical network system and an optical transmission system including such a wavelength conversion apparatus.

2. Related Background Art

A wavelength conversion apparatus can generate output light having a different wavelength (i.e., a different optical frequency) from the wavelength of input light and output the generated output light. Generally, in a wavelength conversion apparatus, the input light and pumping light are inputted to a nonlinear optical medium, to generate four-wave mixing (FWM) which is one type of non-linear optical phenomenon in the nonlinear optical medium and to generate output light having a new wavelength by the four-wave mixing and output the generated output light (see Japanese Laid-Open Patent Publication Nos. 10-133240 and 2000-081643).

The wavelength conversion apparatus can wavelength-convert WDM (Wavelength-Division Multiplexing) signals, obtained by multiplexing signal components in a plurality of channels with wavelengths different from each other, into TDM (Time-Division Multiplexing) signals which have a predetermined wavelength and which are multiplexed so as for them not to overlap each other along a time-line. As a method of wavelength-converting from WDM signals to TDM signals, for example, wavelength conversion methods disclosed in Document 1 (H. Sotobayashi et al., "40 Gbit/s photonic packet compression and decompression by supercontinuum generation", Electronics Letters, Vol. 37, Issue, 2, pp. 110-111, January, 2001) and Document 2 (J. P. R. Lacey et al., "All-optical WDM to TDM transmultiplexer", Electronics Letters, Vol. 30, Issue. 19, pp. 1612-1613, September, 1994) are known.

Namely, Document 1 discloses a method of converting inputted WDM signals into TDM signals by generating a supercontinuum to the inputted WDM signals, expanding spectra of channel signals so as for them to overlap each other, and thereafter slicing them by a specific filter. Also, Document 2 discloses a TDM conversion method using a phenomenon such that the waveforms of the WDM signals are copied onto CW (Continuous-Wave) light by introducing the WDM signals and the CW light with a wavelength to be converted into a device (EAM: Electro-Absorption Modulator) whose absorption coefficient decreases to the intensity of input light.

When the input light is light whose intensity is modulated, the output light obtained by the wavelength conversion is also similarly light whose intensity is modulated. This allows the wavelength conversion apparatus to be used in converting the wavelength of light signal transmitted in an optical network system and an optical transmission system, for example.

SUMMARY OF THE INVENTION

The inventors have studied conventional optical wavelength conversion apparatuses in detail, and as a result, have found problems as follows. Namely, in a conventional wavelength conversion apparatus, when the wavelength of input light is changed, the wavelength of output light is also changed. In a wavelength conversion apparatus to be used in a future optical network system or the like, it may be desirable that the wavelength of output light is constant even when the wavelength of input light is changed.

Additionally, in accordance with the wavelength conversion methods disclosed in Documents 1 and 2, the waveforms of the wavelength-converted signals deteriorate. Specifically, in Document 1, since a shape of signal spectrum corresponds to a spectrum shape of filter, a signal waveform remarkably depends on a spectrum shape of filter. Therefore, it is necessary to change a filter in accordance with signal bit rate or modulation method to be employed. On the other hand, in Document 2, since a saturated absorption due to electric carrier is used, the upper limit of response speed is restricted, and therefore a signal waveform is easily deteriorated when a high speed TDM signal conversion is carried out.

In order to overcome the above-mentioned problems, it is an object of the present invention to provide a wavelength conversion apparatus capable of making the wavelength of output light constant even when the wavelength of input light is changed, and to further provide an optical network system and an optical transmission system including such a wavelength conversion apparatus.

A wavelength conversion apparatus according to the present invention relates to a wavelength conversion apparatus that generates output light having a wavelength different from the wavelength of input light and outputs the generated output light. The wavelength conversion apparatus comprises a first wavelength converter, and a second wavelength converter. The first wavelength converter generates four-wave mixing by the input light and first pumping light having a single wavelength, generates intermediate light having a new wavelength by the four-wave mixing, and outputs the intermediate light and the input light. The second wavelength converter generates four-wave mixing by the intermediate light and the input light, respectively outputted from the first wavelength converter, and second pumping light, generates output light having a new wavelength by the four-wave mixing, and outputs the generated output light. In this case, it is preferable that the wavelength of the first pumping light is different from that of the second pumping light.

The first wavelength converter suitably comprises a first pumping light source for outputting the first pumping light, a first nonlinear optical medium for generating the four-wave mixing upon receipt of the first pumping light outputted from the first pumping light source and the input light to generate the intermediate light, and a first optical filter for selectively transmitting and outputting the intermediate light and the input light out of the lights outputted from the first nonlinear optical medium. The second wavelength converter suitably comprises a second pumping light source for outputting the second pumping light, a second nonlinear optical medium for generating the four-wave mixing upon receipt of the intermediate light and the input light, which are outputted from the first wavelength converter, and the second pumping light outputted from the second pumping light source to generate the output light, and a second optical filter for selectively transmitting and outputting the output light out of the lights outputted from the second nonlinear optical medium.

Furthermore, in the wavelength conversion apparatus according to the present invention, the first wavelength converter may generates four-wave mixing by the input light and first pumping light having a plurality of wavelengths, generates first intermediate light and second intermediate light each having a new wavelength by the four-wave mixing, and outputs the generated first and second intermediate lights. The second wavelength converter may generates four-wave mixing by the first intermediate light and the second intermediate light, respectively outputted from the first wavelength converter, and second pumping light, generates output light having a new wavelength by the four-wave mixing, and outputs the generated output light. In this case, the wavelength of the first pumping light is also different from that of the second pumping light.

The first wavelength converter suitably comprises a first pumping light source for outputting the first pumping light, a first nonlinear optical medium for generating the four-wave mixing upon receipt of the first pumping light outputted from the first pumping light source and the input light to generate the first intermediate light and the second intermediate light, and a first optical filter for selectively transmitting and outputting the first intermediate light and the second intermediate light out of the lights outputted from the first nonlinear optical medium. The second wavelength converter suitably comprises a second pumping light source for outputting the second pumping light, a second nonlinear optical medium for generating the four-wave mixing upon receipt of the first intermediate light and the second intermediate light, which are outputted from the first wavelength converter, and the second pumping light outputted from the second pumping light source to generate the output light, and a second optical filter for selectively transmitting and outputting the output light out of the lights outputted from the second nonlinear optical medium.

In the wavelength conversion apparatus according to the present invention, the input light is wavelength-converted in the first wavelength converter to output the intermediate light, and the intermediate light is further wavelength-converted in the second wavelength converter to output the output light. The wavelength conversion is thus carried out twice, so that the wavelength of the output light becomes constant even when the wavelength of the input light varies. In the wavelength conversion apparatus according to the present invention, it is preferable that variations in the optical frequency of the output light are smaller than variations in the optical frequency of the input light, and it is also preferable that the extinction ratio of the output light is higher than the extinction ratio of the input light.

The wavelength conversion apparatus can wavelength-convert WDM signals in a plurality of channels with wavelengths different from each other into TDM signals with a predetermined wavelength so as for them not to overlap each other along a time-line.

An optical network system according to the present invention comprises N (N is an integer of 2 or more) optical transmission lines, N optical switches, a first optical multiplexer, N optical delay units, a second optical multiplexer, the above-mentioned wavelength conversion apparatus according to the present invention, and signal returning means. The N optical switches are respectively provided halfway in the N optical transmission lines. The first optical multiplexer receives light signals respectively transmitted from the N optical switches, multiplexes the light signals, and outputs the multiplexed light signals to a common transmission line. The N optical delay units are respectively provided in correspondence with the N optical switches, and each of the N optical delay units delays the light signals transmitted from the corresponding optical switches and outputs the delayed light signals. The second optical multiplexer receives the light signals respectively outputted from the N optical delay units, multiplexes the light signals, and outputs the multiplexed signals. The wavelength conversion apparatus wavelength-converts the multiplexed signals outputted from the second optical multiplexer. The signal returning means returns the light signals outputted from the wavelength conversion apparatus to any one of the N optical transmission lines between the N optical switches and the first optical multiplexer or the common optical transmission line.

In the optical network system according to the present invention, the light signals, having been transmitted through each of the optical transmission lines to reach the optical switch, is transmitted to either one of the corresponding optical delay unit and first optical multiplexer after a destination of the subsequent transmission is switched by the optical switch. The light signals which have reached the first optical multiplexer are multiplexed by the first optical multiplexer, and the multiplexed signals are outputted to the common optical transmission line. The light signals having reached the optical delay unit is allowed predetermined delay by the optical delay unit, and is then inputted to the wavelength conversion apparatus. In the wavelength conversion apparatus, each inputted light signal is wavelength-converted and outputted. In the wavelength conversion by the wavelength conversion apparatus, the optical frequency of each outputted light signal is constant irrespective of the optical frequency of each inputted light signal. The light signals outputted from the wavelength conversion apparatus is returned to any one of the N optical transmission lines between the N optical switches and the first optical multiplexer or the common optical transmission line by the signal returning means.

In the case of wavelength-converting WDM signals into TDM signals by using the wavelength conversion apparatus having the above-mentioned configuration, the optical network system according to the present invention preferably comprises optical delay units every signal channel. Each of the optical delay units inputs WDM signals, which appear intermittently in each channel, and gives a delay every channel so as for the channel signals no to overlap each other along a time-line. In the optical network system having such a configuration, a signal-existence probability can be increased in an output channel outputted from the wavelength conversion apparatus because the signal delay is adjusted by each optical delay unit. Also, since the signal delay is adjusted by each optical delay unit, the signal spacing in an output channel outputted from the wavelength conversion apparatus.

An optical transmission system according to the present invention comprises an optical transmitter, an optical transmission line, an optical receiver, and the above-mentioned wavelength conversion apparatus according to the present invention. The optical transmitter transmits light signals. The optical transmission line transmits the light signals transmitted from the optical transmitter. The optical receiver receives the light signals transmitted through the optical transmission line. In particular, the optical transmission system is characterized in that the wavelength conversion apparatus is provided just behind the optical transmitter. The wavelength conversion apparatus wavelength-converts the light signals transmitted from the optical transmitter. In the optical transmission system, even when the chirp of each light signal outputted from the optical transmitter is large or the extinction ratio thereof is low, the light signals outputted from the wavelength conversion apparatus is chirp-compensated and waveform-shaped, thereby allowing the transmission distance of the light signals to be extended.

Furthermore, in the optical transmission system according to the present invention, the above-mentioned wavelength conversion apparatus may be provided halfway in the optical transmission line. The wavelength conversion apparatus also wavelength-converts the light signals transmitted through the optical transmission line. In the optical transmission system, even when the chirp of the transmitted light is large or the extinction ratio thereof is low, the light outputted from the wavelength conversion apparatus is chirp-compensated and waveform-shaped, thereby allowing the transmission distance of the light to be extended.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 4 is a table showing characteristics of highly nonlinear dispersion-shifted fibers used in the experimental setup of FIG. 3 at the wavelength of 1550 nm;

FIGS. 5(a)-(b) are diagrams showing optical spectra of the directly modulated laser signal and the four-wave mixing components;

FIGS. 7(a)-(b) are diagrams showing eye patterns of the signals after single-mode fiber transmission without the chirp compensation by the present invention;

FIGS. 9(a)-(b) are diagrams showing a relationship between measured sensitivity and single-mode fiber length and bit error rate of the signals after single-mode fiber transmission without and with the chirp compensation by the present invention;

FIGS. 12(a)-(b) are diagrams for explaining an example of the utilization of the wavelength conversion apparatus according to the first embodiment;

FIGS. 13(a)-(c) are diagrams for explaining chirp compensation and waveform shaping in the wavelength conversion apparatus according to the first embodiment;

FIGS. 15(a)-(b) are diagrams for explaining an arrangement relationship of optical frequencies in the wavelength conversion apparatus according to the second embodiment;

FIGS. 17(a)-(b) are diagrams for explaining the wavelength-conversion from WDM signal to TDM signal;

FIGS. 23(a)-(b) are diagrams showing an optical spectrum in the wavelength conversion apparatus shown in FIG. 22;

FIGS. 24(a)-(b), 25(a)-(b) and 26(a)-(b) are diagrams showing the wavelength of each light and variations in the optical frequency thereof in the wavelength conversion apparatus shown in FIG. 22; and FIGS. 27(a)-(b) are diagrams showing eye patterns of signals after transmission in an optical transmission system using the wavelength conversion apparatus shown in FIG. 22.

DETAILED DESCRIPTION OF THE PREFERRED EMBODIMENTS

In the following, embodiments of an optical wavelength conversion apparatus, an optical network system and an optical transmission system according to the present invention will be explained in detail with reference to FIGS. 1 to 27. In the explanation of the drawings, constituents identical to each other will be referred to with numerals identical to each other without repeating their overlapping descriptions.

The present invention has been achieved as a result of the Inventors' study concerning chirp compensation using four-wave mixing (FWM) and an application to SMF transmission employing 10 Gbit/s directly modulated laser (DML). The chirp compensation by this invention will be explained as follows.

(Principle of chirp compensation using FWM)

Figure 1:
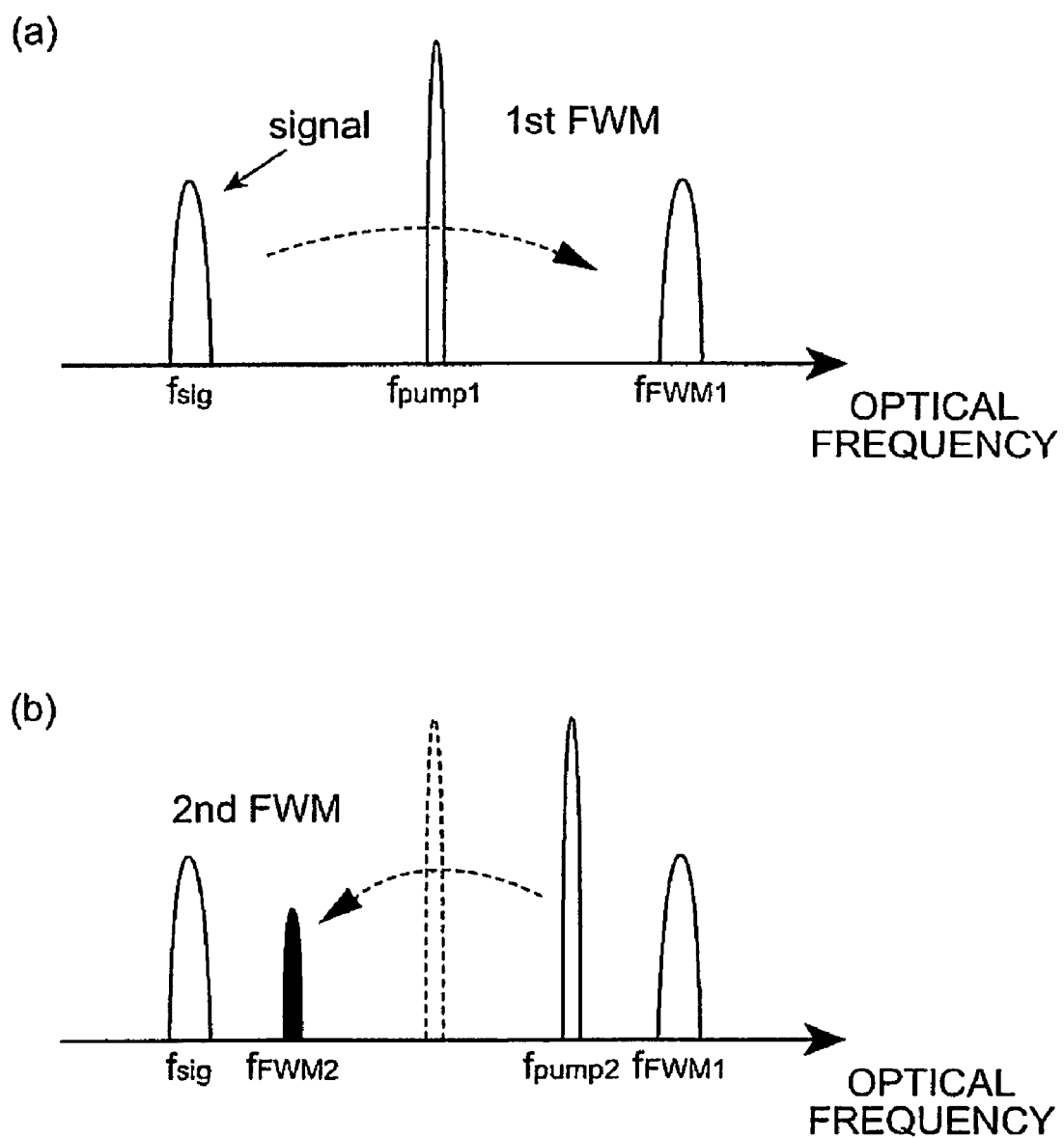
FIGS. 1(a)-(b) are diagrams showing a process of four-wave mixing generation in chirp compensation by the present invention.
Figure 2:
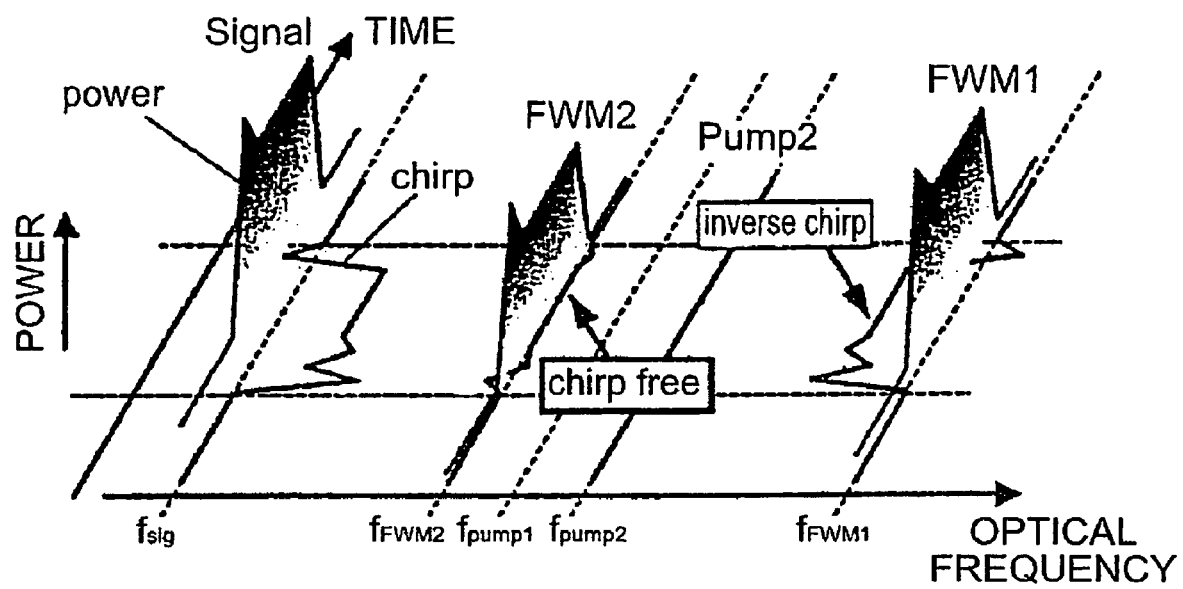
FIG. 2 is a diagram showing a chirp swing of the first and second four-wave mixing components.

FIG. 1 shows a schematic of chirp compensation of DML using FWM. In the first nonlinear medium, the DML signal at a temporal frequency of $f_{sig}(t)$ and a continuous-wave (CW) pumping light at the frequency of $f_{pump1}$ generate a replica of the original signal at $f_{FWM1}=2f_{pump1}-f_{sig}(t)$ as a FWM component (see the area (a) in FIG. 1). In the next stage, after the first pumping light is eliminated by an optical filter, another CW pumping light with the frequency of $f_{pump2}$ which is different from the first one is added to the remained light components. Although three lights generate several FWM components in the second nonlinear medium, one of the components stands at $f_{FWM2}(t)=f_{FWM1}(t)+f_{sig}(t)-f_{pump2}$. The $f_{FWM2}(t)$ proves to be equal to $2f_{pump1}-f_{pump2}$, which means that the frequency of the second FWM component is independent of that of the original signal (see the area (b) in FIG. 1). FIG. 2 also illustrates the second FWM generation in the viewpoint of power and chirp. Because the chirp swing of the first FWM component has an inverse relation to that of the original signal, both the transient and adiabatic chirps of the original signal are cancelled out in the second FWM generation.

While chirp compensation using SPM (Self-Phase Modulation) is effective only for the transient chirp, this method is effective for any type of chirp swing. Moreover, this invention has an extra advantage of improvement in extinction ratio (ER). The strength in non-degenerate FWM is proportional to the power product of three optical components, which results in reduction of the zero level of the FWM signal.

(Experimental Results)

Figure 3:
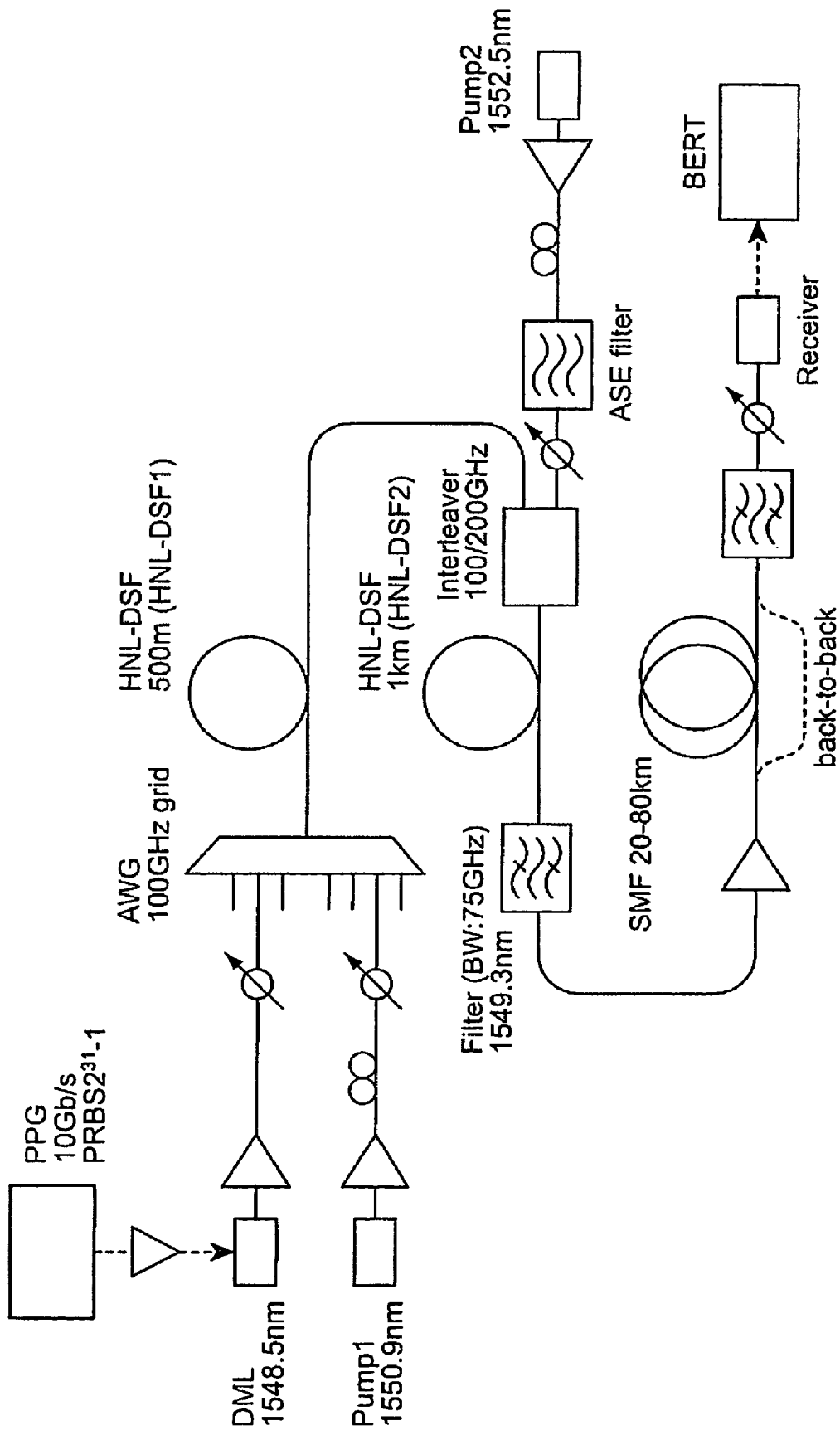
FIG. 3 is a showing a configuration of an experimental setup.

FIG. 3 is a diagram showing a configuration of an experimental setup. In the experimental setup, a 10 Gbit/s DML signal is used as an object for chirp compensation and two highly nonlinear dispersion-shifted fiber (HNL-DSF) with 0.5 km and 1.0 km length (HNL-DSF1, HNL-DSF2) are used as FWM media. The characteristics of HNL-DSF1 and HNL-DSFs are listed in the table shown in FIG. 4. Namely, the HNL-DSF1 has, as characteristics at the wavelength of 1550 nm, a length L of 0.5 km, a transmission loss α of 0.53 dB/km, a chromatic dispersion D of −0.02 ps/nm/km, a dispersion slope $D_{slope}$ of 0.03 ps/nm²/km, and an effective area $A_{eff}$ of 11.0 μm. The HNL-DSF2 has, as characteristics at the wavelength of 1550 nm, a length L of 1.0 km, a transmission loss α of 0.57 dB/km, a chromatic dispersion D of 0.03 ps/nm/km, a dispersion slope $D_{slope}$ of 0.03 ps/nm²/km, and an effective area $A_{eff}$ of 10.5 μm. The oscillating wavelength of the 10 Gbit/s DML is 1548.5 nm and the ER is about 6 dB. The DML signal is combined with the first CW pumping light at 1550.9 nm using an array waveguide grating (AWG) with 100 GHz spacing, and the first FWM component is generated in the following HNL-DSFs. A 100/200 GHz interleaver is used in order to extract the FWM components locating at 1553.3 nm and the DML signal, and to combine the second CW pumping light at 1552.5 nm. The second FWM components are generated in the following HNL-DSFs, and the component at 1549.3 nm is extracted by a 75 GHz bandwidth filter as a chirp-compensated signal.

FIG. 5 shows optical spectra of the signals at several points. Specifically, in the area (a) in FIG. 5, the graph G510 shows an optical spectrum of the signal at the point before the HNL-DSF1, the graph G520 shows an optical spectrum of the signal at the point after the HNL-DSF1, and the graph G530 shows an optical spectrum of the signal at the point after the interleaver. Additionally, in the area (b) in FIG. 5, the graph G540 shows an optical spectrum of the signal at the point after the HNL-DSF2, and the graph G550 shows an optical spectrum of the signal at the point after the optical filter.

The input power of the first pumping light into HNL-DSF1 and the second pumping light into HNL-DSF2 are set to be +16 dBm and +12 dBm, respectively. Both spectra of the DML signal and the first FWM signal are asymmetrical in shape due to the existence of adiabatic chirp. On the contrary, the spectrum of the second FWM signal has a symmetrical shape owing to the full compensation of adiabatic chirp.

Figure 6:
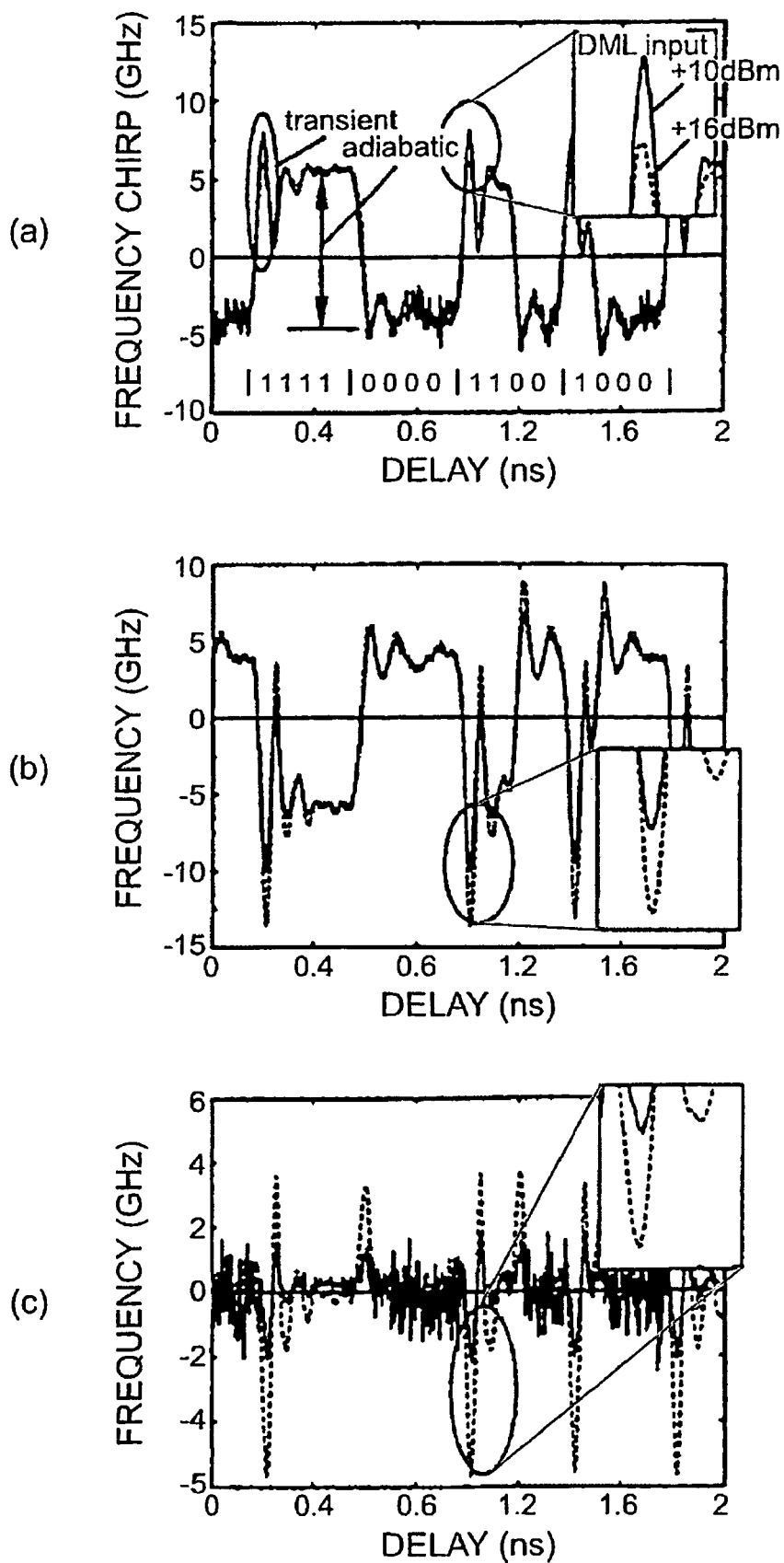
FIGS. 6(a)-(c) are diagrams showing results of chirp measurement of the directly modulated laser signal at 1548.5 nm, the first four-wave mixing component at 1553.3 nm and the second four-wave mixing component at 1549.3 nm.

Next, the chirp swing of the DML signal and two FWM signals are measured with 16 bit pattern of "1111/0000/1100/1000" by an Agilent optical spectrum analyzer (86100A) with chirp measurement software. FIG. 6 shows measurement results of power and chirp swing at various input levels of the DML signal into HNL-DSF1. In FIG. 6, the area (a) shows a result of chirp measurement of the DML signal at 1548.5 nm, the area (b) shows a result of chirp measurement of the first FWM component at 1553.3 nm, and the area (c) shows a result of measurement of the second FWM component at 1549.3 nm. As can be seen from FIG. 6, the adiabatic chirp of about 10 GHz in the DML signal is mostly compensated by this invention. Although the transient chirp in the DML signal is alleviated, it remained in the negative. As the transient chirp in the first FWM component is intensified by increasing the DML input level, SPM and XPM (Cross-Phase Modulation) also occurred in HNL-DSFs.

Figure 8:
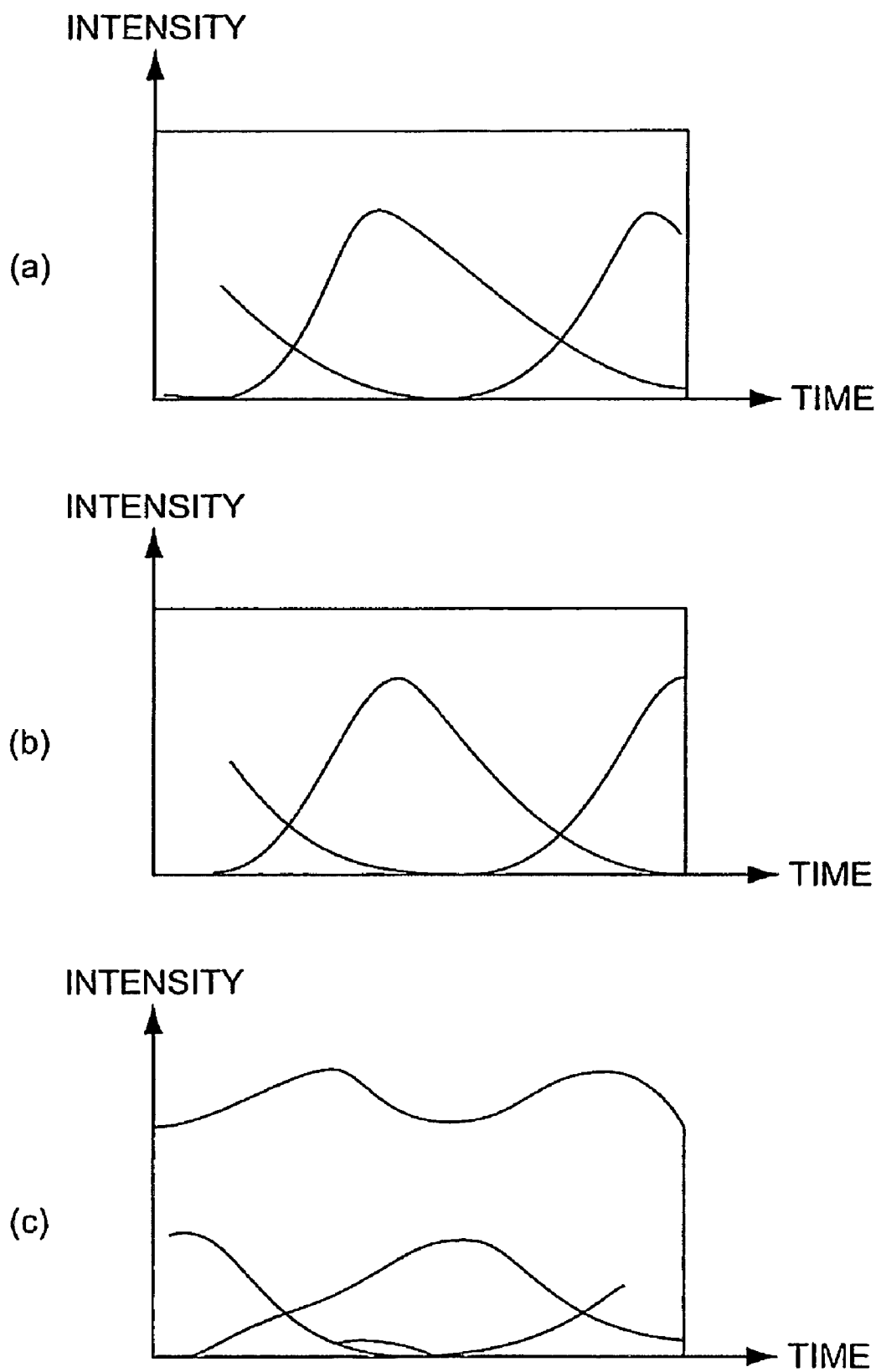
FIGS. 8(a)-(c) are diagrams showing eye patterns of the signals after single-mode fiber transmission with the chirp compensation by the present invention.

FIG. 7 depicts eye patterns of the signals without chirp compensation after SMF transmission at the DML input power of +12 dBm into HNL-DSF1. In FIG. 7, the area (a) shows the eye pattern of signal after back-to-back transmission, the area (b) shows the eye pattern of signal after the 20 km SMF. Whereas FIG. 8 depicts eye patterns of the signals with chirp compensation after SMF transmission at the DML input power of +12 dBm into HNL-DSF1. In FIG. 8, the area (a) shows the eye pattern of signal after back-to-back transmission, the area (b) shows the eye pattern of signal after the 20 km SMF, and the area (c) shows the eye pattern of signals after the 80 km SMF. Without compensation, the eye pattern after only 20 km transmission is too much distorted to distinguish the eye shape. On the other hand, the eye opening of the chirp-compensated signal is spread by SMF and kept still large after 80 km transmission. The large dispersion tolerance is due to waveform compression by the combination of the remained negative transient chirp and positive dispersion. In addition, chirp compensation also increased the ER from 6 dB to 13 dB. The concrete results, corresponding to FIGS. 7 and 8, are disclosed in the document: "10 Gbit/s directly modulated signal transmission over 80 km SMF with chirp compensation using four-wave mixing", CLEO2004, CThG1.

FIG. 9 shows measurement results of bit error rate (BER) and minimum sensitivity of the signals after SMF transmission. In the area (a) in FIG. 9, the graph G910 shows a relationship between the SMF length (km) and the minimum sensitivity (dBm) at the DML input power of +10 dBm, the graph G920 shows a relationship between the SMF length (km) and the minimum sensitivity (dBm) at the DML input power of +12 dBm, the graph G930 shows a relationship between the SMF length (km) and the minimum sensitivity (dBm) at the DML input power of +14 dBm, and the graph G910 shows a relationship between the SMF length (km) and the minimum sensitivity (dBm) at the DML input power of +16 dBm. Whereas, in the area (b) in FIG. 9, the graphs G951 to G953 are measurement results without chirp compensation, and the graph G951 shows a relationship between the received optical power (dBm) and the ER (Log) at the condition that the ER is 6 dB and the SMF length is 0 km, the graph G952 shows a relationship between the received optical power (dBm) and the ER (Log) at the condition that the ER is 6 dB and the SMF length is 20 km, and the graph G953 shows a relationship between the received optical power (dBm) and the ER (Log) at the condition that the ER is 9 dB and the SMF length is 0 km. Furthermore, the graphs G961 to G965 are measurement results with chirp compensation of this invention, the graph G961 shows a relationship between the received optical power (dBm) and the ER (Log) at the condition that the ER is 6 dB and the SMF length is 0 km, the graph G962 shows a relationship between the received optical power (dBm) and the ER (Log) at the condition that the ER is 6 dB and the SMF length is 20 km, the graph G963 shows a relationship between the received optical power (dBm) and the ER (Log) at the condition that the ER is 6 dB and the SMF length is 40 km, the graph G964 shows a relationship between the received optical power (dBm) and the ER (Log) at the condition that the ER is 6 dB and the SMF length is 60 km, and the graph G965 shows a relationship between the received optical power (dBm) and the ER (Log) at the condition that the ER is 6 dB and the SMF length is 80 km. Without compensation, large degradation is observed even after 20 km transmission. On the contrary, the result in the chirp-compensated signal shows good performance after 80 km transmission. FIG. 9 also shows that an increase in DML input power into HNL-DSFs improves the sensitivity. Less than 0.1 dB penalty is achieved at the DML input power of +16 dBm even after 80 km SMF transmission. The chirp-compensated DML has a dispersion tolerance equal to that of a lithium-niobate modulator.

SUMMARY

As described above, this invention can successfully transmit compensated signals over 80 km SMF due to the remained negative transient chirp. This chirp compensation can be a way to apply cost-effective lasers to advanced photonic networks.

First Embodiment of Wavelength Conversion Apparatus

Figure 10:
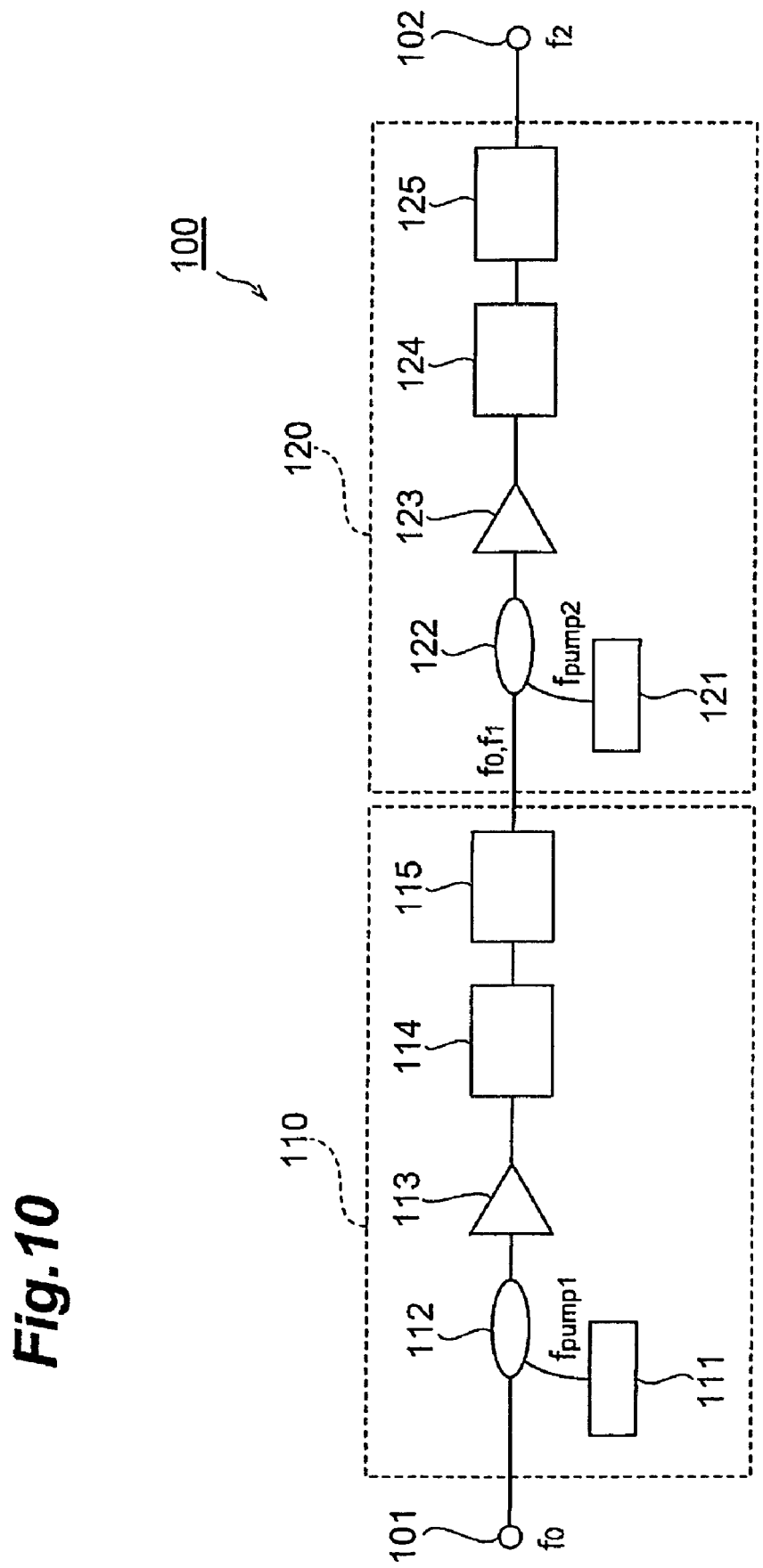
FIG. 10 is a diagram showing a configuration of a first embodiment of a wavelength conversion apparatus according to the present invention.

A first embodiment of a wavelength conversion apparatus according to the present invention will be described as follows. FIG. 10 is a diagram showing a configuration of a first embodiment of a wavelength conversion apparatus according to the present invention. The wavelength conversion apparatus 100 shown in FIG. 10 receives input light at its input end (incidence end) 101, to generates output light having a wavelength different from the wavelength of the input light, and output the generated output light from its output end (emission end) 102. The wavelength conversion apparatus 100 comprises a first wavelength converter 110 and a second wavelength converter 120 in series between the input end 101 and the output end 102.

The first wavelength converter 110 generates FWM by the input light and first pumping light, to generate intermediate light having a new wavelength by the FWM, and output the intermediate light and the input light. More specifically, the first wavelength converter 110 comprises a first pumping light source 111, a first optical coupler 112, a first optical amplifier 113, a first nonlinear optical medium 114, and a first optical filter 115.

The first pumping light source 111 outputs first pumping light having an optical frequency $f_{pump1}$. The first optical coupler 112 receives input light having an optical frequency $f_0$ inputted to the input end 101 as well as the first pumping light outputted from the first pumping light source 111, to couple the input light and the first pumping light, and output the coupled light components. The first optical amplifier 113 receives the input light and the first pumping light which are outputted after being coupled by the first optical coupler 112, to optically amplify the input light and the first pumping light, and output the optically amplified light.

The first nonlinear optical medium 114 receives the input light and the first pumping light which are outputted after being optically amplified by the first optical amplifier 113, to generate FWM by the input light and the first pumping light, and generate intermediate light having an optical frequency $f_1$ by the FWM. The first optical filter 115 selectively transmits and outputs the intermediate light and the input light out of the lights outputted from the first nonlinear optical medium 114.

The second wavelength converter 120 generates FWM by the intermediate light and the input light which are outputted from the first wavelength converter 110 and second pumping light, to generate output light having a new wavelength by the FWM, and output the generated output light. More specifically, the second wavelength converter 120 comprises a second pumping light source 121, a second optical coupler 122, a second optical amplifier 123, a second nonlinear optical medium 124, and a second optical filter 125.

The second pumping light source 121 outputs second pumping light having an optical frequency $f_{pump2}$. The second optical coupler 122 receives the intermediate light and the input light which are outputted from the first wavelength converter 110 as well as the second pumping light outputted from the second pumping light source 121, to couple the intermediate light, the input light, and the second pumping light, and output the coupled lights. The second optical amplifier 123 receives the intermediate light, the input light, and the second pumping light which are outputted after being coupled by the second optical coupler 122, to optically amplify the intermediate light, the input light, and the second pumping light, and output the optically amplified light.

The second nonlinear optical medium 124 receives the intermediate light, the input light, and the second pumping light which are outputted after being optically amplified by the second optical amplifier 123, to generate FWM by the intermediate light, the input light, and the second pumping light, and generate output light having an optical frequency $f_2$ by the FWM. The second optical filter 125 selectively transmits and outputs the output light out of the lights outputted from the second nonlinear optical medium 124.

An Er element-doped optical fiber amplifier using as an optical amplification medium an optical fiber having an Er element doped to its optical waveguide region, for example, is suitably used for each of the first optical amplifier 113 and the second optical amplifier 123. An optical fiber having a highly nonlinear optical coefficient γ and a chromatic dispersion near zero at the frequencies $f_{pump1}$ and $f_{pump2}$, for example, is suitably used for each of the first nonlinear optical medium 114 and the second nonlinear optical medium 124. The first optical amplifier 113 optically amplifies each of the light components inputted to the first nonlinear optical medium 114 with high gain such that the FWM occurs at sufficient efficiency in the first nonlinear optical medium 114. Similarly, the second optical amplifier 123 optically amplifies each of the lights inputted to the second nonlinear optical medium 124 with high gain such that the FWM occurs at sufficient efficiency in the second nonlinear optical medium 124.

Figure 11:
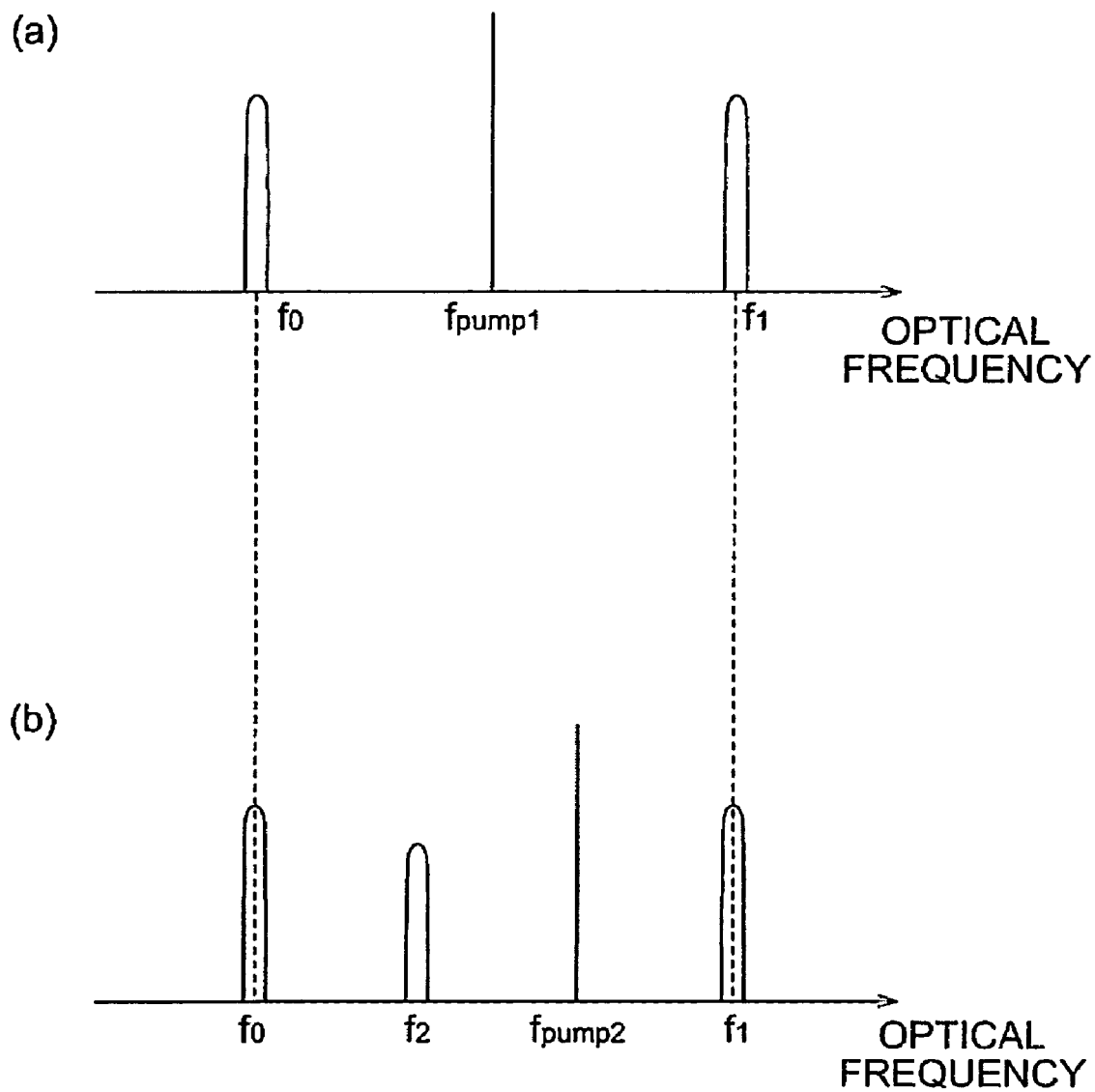
FIGS. 11(a)-(b) are diagrams for explaining an arrangement relationship of optical frequencies in the wavelength conversion apparatus according to the first embodiment.

FIG. 11 is a diagram for explaining an arrangement relationship among optical frequencies in the wavelength conversion apparatus 100 according to the first embodiment. In the first wavelength converter 110, there is a relationship expressed by the area (a) in FIG. 11 and the following equation (1) among the optical frequency $f_0$ of the input light, the optical frequency $f_1$ of the intermediate light, and the optical frequency $f_{pump1}$ of the first pumping light. That is, the first wavelength converter 110 outputs the intermediate light having the optical frequency $f_1$ generated by degenerate FWM.

$$f_1 = 2f_{pump1} - f_0 \quad (1)$$

On the other hand, in the second wavelength converter 120, there is a relationship expressed by the area (b) in FIG. 11 and the following equation (2) among the optical frequency $f_0$ of the input light, the optical frequency $f_1$ of the intermediate light, the optical frequency $f_2$ of the output light, and the optical frequency $f_{pump2}$ of the second pumping light. That is, the second wavelength converter 120 outputs the output light having the optical frequency $f_2$ generated by non-degenerate FWM.

$$f_2 = f_0 + f_1 - f_{pump2} \quad (2)$$

When the foregoing equation (1) is substituted in the foregoing equation (2), the following equation (3) is obtained. As can be seen from the equation (3), the optical frequency $f_2$ of the output light does not depend on the optical frequency $f_0$ of the input light, but depends on only the optical frequency $f_{pump1}$ of the first pumping light and the optical frequency $f_{pump2}$ of the second pumping light.

$$f_2 = 2f_{pump1} - f_{pump2} \quad (3)$$

Thus, the wavelength conversion apparatus 100 according to the first embodiment can make the wavelength of the output light outputted from the output end 102 constant even when the wavelength of the input light inputted to the input end 101 is changed.

FIG. 12 is a diagram for explaining an example of the utilization of the wavelength conversion apparatus 100 according to the first embodiment. The area (a) in FIG. 12 shows an arrangement relationship among the optical frequencies, and the area (b) in FIG. 12 shows how each of the light signals is multiplexed. It is assumed that the input light inputted to the input end 101 of the wavelength conversion apparatus 100 has any one of optical frequencies $f_{01}$, $f_{02}$, and $f_{03}$. It is assumed that the input light having each of the optical frequencies $f_{01}$, $f_{02}$, and $f_{03}$ is inputted to the input end 101 in a certain predetermined time period, while not being inputted to the input end 101 in the other time period, similarly to a burst signal. Further, it is assumed that two or more of the input lights having the optical frequencies $f_{01}$, $f_{02}$, and $f_{03}$ are not simultaneously inputted to the input end 101. In such a case, the wavelength conversion apparatus 100 can wavelength-convert the input lights having the optical frequencies inputted to the input end 101, multiplex all the input lights as output light having a predetermined optical frequency $f_2$, and output the output light from the output end 102.

The wavelength conversion apparatus 100 according to the first embodiment can compensate for the chirp of the input light and shape the waveform thereof to obtain output light together with the wavelength conversion. FIG. 13 is a diagram for explaining the chirp compensation and the waveform shaping in the wavelength conversion apparatus 100 according to the first embodiment. The area (a) in FIG. 13 shows the respective changes in time of the optical intensity and the optical frequency of the input light inputted to the input end 101. The area (b) in FIG. 13 shows the respective changes in time of the optical intensity and the optical frequency of the intermediate light outputted from the first wavelength converter 110. The area (c) in FIG. 13 shows the respective changes in time of the optical intensity and the optical frequency of the output light outputted from the output end 102.

When the input light inputted to the input end 101 is outputted from a DML (Directly Modulated Laser), for example, the input light exhibits a transient chirp phenomenon in which the optical frequency varies on the leading edge and the trailing edge of a pulse, and exhibits an adiabatic chirp phenomenon in which the optical frequency differs depending on the level of the optical intensity, as shown in the area (a) of FIG. 13. By utilizing SPM (self-phase modulation), the transient chirp can be compensated for, while the adiabatic chirp cannot be compensated for.

In the wavelength conversion apparatus 100 according to the first embodiment, the chirp distribution of the intermediate light is the reverse of the chirp distribution of the input light, as shown in the area (b) of FIG. 13. The chirp distribution of the output light is obtained by canceling the respective chirp distributions of the input light and the intermediate light, as shown in the area (c) of FIG. 13. Thus, the output light outputted from the output end 102 is obtained by compensating for the chirp of the input light inputted to the input end 101. Variations in the output frequency of the output light are smaller than variations in the optical frequency of the input light.

As shown in the areas (a) and (b) of FIG. 13, the waveform of the intermediate light is similar to the waveform of the input light which causes the waveform of the intermediate light. As shown the area (c) of in FIG. 13, the waveform of the output light is represented by the product of the respective waveforms of the input light and the intermediate light which cause the waveform of the output light. Consequently, the output light outputted from the output end 102 is obtained by waveform-shaping the input light inputted to the input end 101. The extinction ratio of the output light is higher than the extinction ratio of the input light.

Such chirp compensation and waveform shaping make it possible to also significantly extend the transmission distance in the optical transmission system using the DML.

Second Embodiment of Wavelength Conversion Apparatus

Figure 14:
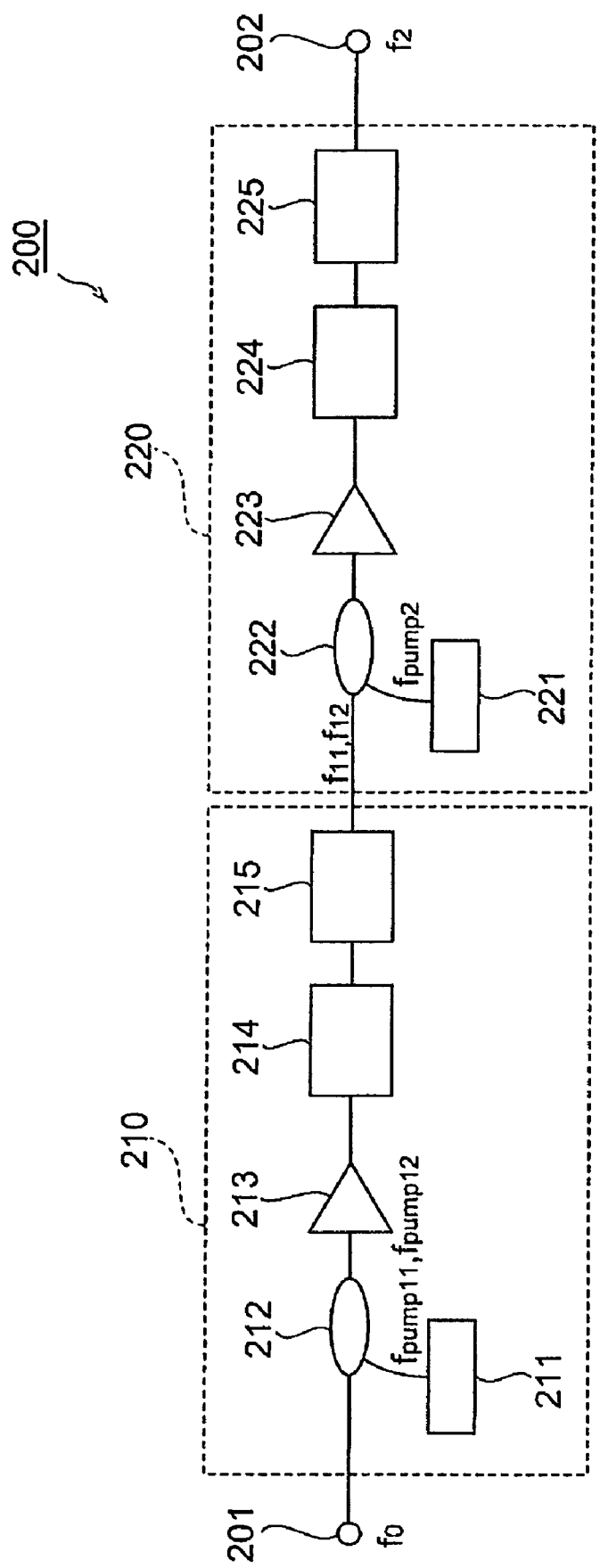
FIG. 14 is a diagram showing a configuration of a second embodiment of a wavelength conversion apparatus according to the present invention.

A second embodiment of a waveform conversion apparatus according to the present invention will be then described. FIG. 14 is a diagram showing a configuration of a second embodiment of a wavelength conversion apparatus according to the present invention. The wavelength conversion apparatus 200 shown in FIG. 14 receives input light at its input end 201, to generate output light having a wavelength different from the wavelength of the input light, and output the generated output light from its output end 202. The wavelength conversion apparatus 200 comprises a first wavelength converter 210 and a second wavelength converter 220 in series between the input end 201 and the output end 202.

The first wavelength converter 210 generates FWM by the input light and first pumping light, to generate first intermediate light and second intermediate light each having a new wavelength by the FWM, and output the first intermediate light and the second intermediate light. More specifically, the first wavelength converter 210 comprises a first pumping light source 211, a first optical coupler 212, a first optical amplifier 213, a first nonlinear optical medium 214, and a first optical filter 215.

The first pumping light source 211 outputs as the first pumping light pumping lights respectively having an optical frequency $f_{pump11}$ and an optical frequency $f_{pump12}$. The first optical coupler 212 receives input light having an optical frequency $f_0$ inputted to the input end 201 as well as the first pumping lights having two wavelengths outputted from the first pumping light source 211, to couple the input light and the first pumping lights, and output the coupled lights. The first optical amplifier 213 receives the input light and the first pumping lights which are outputted after being coupled by the first optical coupler 212, to optically amplify the input light and the first pumping lights, and output the optically amplified light.

The first nonlinear optical medium 214 receives the input light and the first pumping light including the two wavelengths which are outputted after being optically amplified by the first optical amplifier 213, to generate FWM by the input light and the first pumping light, and generate first intermediate light having an optical frequency $f_{11}$ and second intermediate light having an optical frequency $f_{12}$ by the FWM. The first optical filter 215 selectively transmits and outputs the first intermediate light and the second intermediate light out of the light components outputted from the first nonlinear optical medium 214.

The second wavelength converter 220 generates FWM by the first intermediate light and the second intermediate light which are outputted from the first wavelength converter 210 and second pumping light, to generate output light having a new wavelength by the FWM, and output the generated output light. More specifically, the second wavelength converter 220 comprises a second pumping light source 221, a second optical coupler 222, a second optical amplifier 223, a second nonlinear optical medium 224, and a second optical filter 225.

The second pumping light source 221 outputs second pumping light having an optical frequency $f_{pump2}$. The second optical coupler 222 receives the first intermediate light and the second intermediate light which are outputted from the first wavelength converter 210 as well as the second pumping light outputted from the second pumping light source 221, to couple the first intermediate light, the second intermediate light, and the second pumping light, and output the coupled light components. The second optical amplifier 223 receives the first intermediate light, the second intermediate light, and the second pumping light which are outputted after being coupled by the second optical coupler 222, to optically amplify the first intermediate light, the second intermediate light, and the second pumping light, and output the optically amplified light.

The second nonlinear optical medium 224 receives the first intermediate light, the second intermediate light, and the second pumping light which are outputted after being optically amplified by the second optical amplifier 223, to generate FWM by the first intermediate light, the second intermediate light, and the second pumping light, and generate output light having an optical frequency $f_2$ by the FWM. The second optical filter 225 selectively transmits and outputs the output light out of the light components outputted from the second nonlinear optical medium 224.

An Er element-doped optical fiber amplifier using as an optical amplification medium an optical fiber having an Er element doped to its optical waveguide region, for example, is suitably used for each of the first optical amplifier 213 and the second optical amplifier 223. An optical fiber having a highly nonlinear optical coefficient γ and a chromatic dispersion near zero at the frequencies $f_{pump1}$ and $f_{pump2}$, for example, is suitably used for each of the first nonlinear optical medium 214 and the second nonlinear optical medium 224. The first optical amplifier 213 optically amplifies each of the lights inputted to the first nonlinear optical medium 214 with high gain such that the FWM occurs at sufficient efficiency in the first nonlinear optical medium 214. In similar, the second optical amplifier 223 optically amplifies each of the lights inputted to the second nonlinear optical medium 224 with high gain such that the FWM occurs at sufficient efficiency in the second nonlinear optical medium 224.

FIG. 15 is a diagram for explaining an arrangement relationship among optical frequencies in the wavelength conversion apparatus 200 according to the second embodiment. In the second wavelength converter 210, there is a relationship expressed by the area (a) in FIG. 15 and the following equations (4a) and (4b) among the optical frequency $f_0$ of the input light, the optical frequency $f_{11}$ of the first intermediate light, the optical frequency $f_{12}$ of the second intermediate light, and the optical frequencies $f_{pump11}$ and $f_{pump12}$ of the first pumping lights. That is, the first wavelength converter 210 outputs the intermediate light having the optical frequency $f_1$ generated by degenerate FWM.

$$f_{11}=2f_{pump11}-f_0 \quad (4a)$$

$$f_{12}=2f_{pump12}-f_0 \quad (4b)$$

On the other hand, in the second wavelength converter 220, there is a relationship expressed by the (b) in FIG. 15 and the following equation (5) among the optical frequency $f_{11}$ of the first intermediate light, the optical frequency $f_{12}$ of the second intermediate light, the optical frequency $f_2$ of the output light, and the optical frequency $f_{pump2}$ of the second pumping light. That is, the second wavelength converter 220 outputs the output light having the optical frequency $f_2$ generated by non-degenerate FWM.

$$f_2=f_{12}+f_{pump2}-f_{11} \quad (5)$$

When the foregoing equation (4) is substituted in the foregoing equation (5), the following equation (6) is obtained. As can be seen from the foregoing equation (6), the optical frequency $f_2$ of the output light does not depend on the optical frequency $f_0$ of the input light, but depends on only the optical frequencies $f_{pump11}$ and $f_{pump12}$ of the first pumping lights and the optical frequency $f_{pump2}$ of the second pumping light.

$$f_2=2(f_{pump12}-f_{pump11})-f_{pump2} \quad (6)$$

The wavelength conversion apparatus 200 according to the second embodiment can also produce the following effect in addition to producing the same effect as the effect produced by the above-mentioned wavelength conversion apparatus 100 according to the first embodiment. That is, in the wavelength conversion apparatus 100 according to the first embodiment, the input light is used in the second wavelength converter 120, so that the wavelength of the output light cannot be made equal to the wavelength of the input light. On the other hand, in the wavelength conversion apparatus 200 according to the second embodiment, the input light is not used in the second wavelength converter 220, so that the wavelength of the output light can be made equal to the wavelength of the input light.

First Embodiment of Optical Network System

Figure 16:
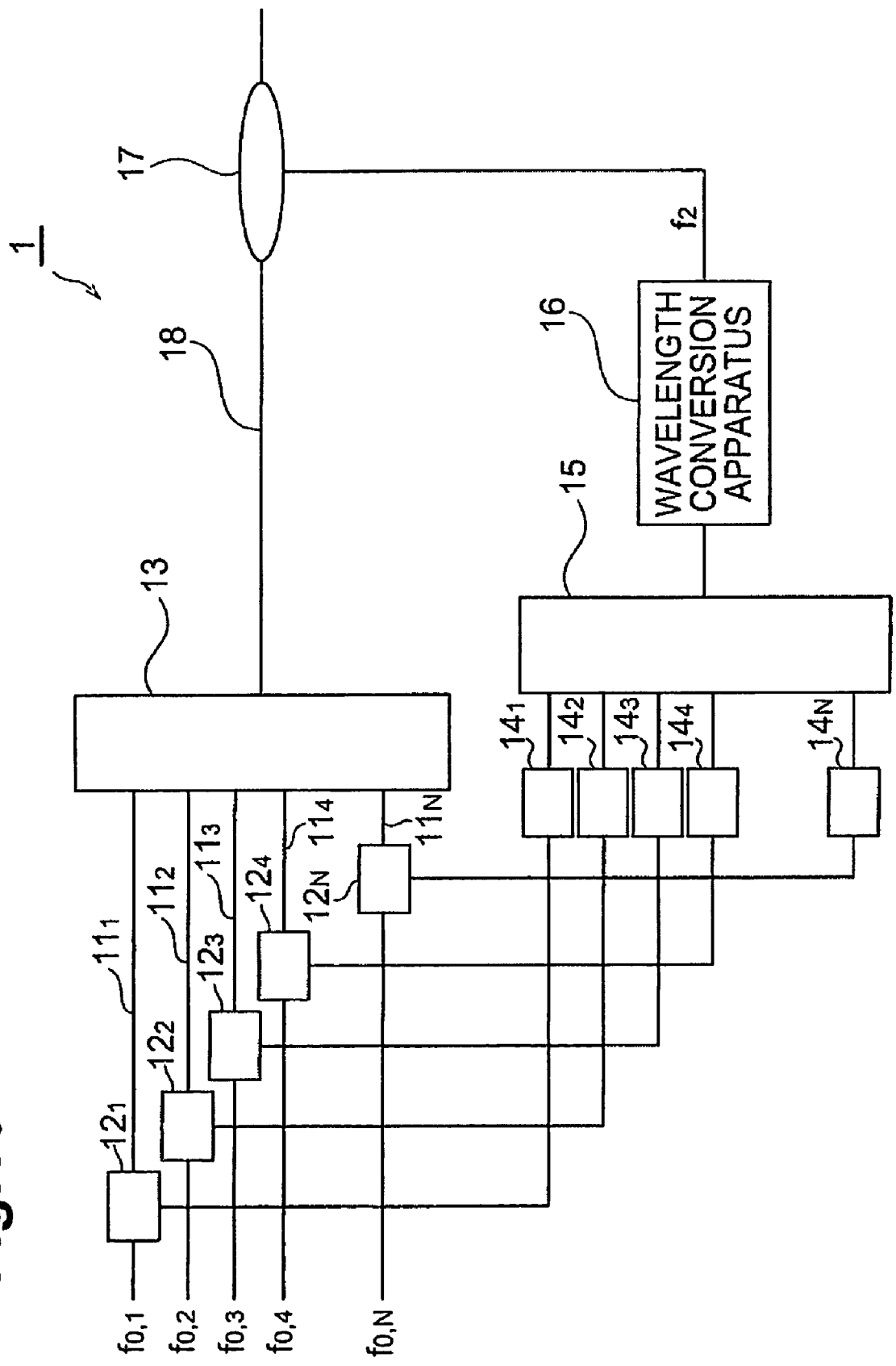
FIG. 16 is a diagram showing a configuration of a first embodiment of an optical network system according to the present invention.

A first embodiment of an optical network system according to the present invention will be then described. FIG. 16 is a diagram showing a configuration of a first embodiment of an optical network system according to the present invention. The optical network system 1 shown in FIG. 16 comprises N optical transmission lines $11_1$ to $11_N$, N optical switches $12_1$ to $12_N$, a first optical multiplexer 13, N optical delay units $14_1$ to $14_N$, a second optical multiplexer 15, a wavelength conversion apparatus 16, an optical coupler 17, and an optical transmission line 18. Here, N is an integer of not less than 2, and n appearing later is an arbitrary integer of not less than 1 nor more than N.

Each of the optical transmission lines $11_n$ transmits light signals having an optical frequency $f_{0,n}$. Each of the optical switches $12_n$ is provided halfway in the optical transmission line $11_n$, and receives the light signals having the optical frequency $f_{0,n}$ transmitted through the optical transmission line $11_n$ and outputs the light signals to either one of the first optical multiplexer 13 and the optical delay unit $14_n$. The first optical multiplexer 13 receives the light signals respectively transmitted through the N optical transmission lines $11_1$ to $11_N$, to multiplex the inputted light signals, and output the multiplexed light signals to the common optical transmission line 18.

Each of the optical delay units $14_n$ delays the light signals transmitted from the corresponding optical switch $12_n$, and outputs the delayed light signals. The second optical multiplexer 15 receives the light signals respectively outputted from the N optical delay units $14_1$ to $14_N$, to multiplex the inputted light signals, and output the multiplexed light signals. The wavelength conversion apparatus 16 wavelength-converts the multiplexed signals outputted from the second optical multiplexer 15, and outputs light signals having an optical frequency $f_2$ obtained by the wavelength conversion. Used as the wavelength conversion apparatus 16 is the above-mentioned wavelength conversion apparatus according to the first embodiment or the second embodiment. The optical coupler 17 returns the light signals outputted from the wavelength conversion apparatus 16 to the common optical transmission line 18.

The optical network system 1 is operated in the following manner. The light signals having the optical frequency $f_{0,n}$ which has been transmitted through each of the optical transmission lines $11_n$ to reach the optical switch $12_n$ is transmitted to either one of the corresponding optical delay unit $14_n$ and the first optical multiplexer 13 after a destination of the subsequent transmission is switched by the optical switch $12_n$. The light signals which have reached the first optical multiplexer 13 are multiplexed by the first optical multiplexer 13, and the multiplexed light signals are outputted to the optical transmission line 18.

The light signals having reached the optical delay unit $14_n$ is allowed predetermined delay by the optical delay unit $14_n$, and is then inputted to the wavelength conversion apparatus 16. In the wavelength conversion apparatus 16, the delayed light signals are wavelength-converted and outputted. In the wavelength conversion by the wavelength conversion apparatus 16, the optical frequency $f_2$ of the outputted light signals is constant irrespective of the optical frequency of the inputted light signals. The light signals outputted from the wavelength conversion apparatus 16 is returned to the optical transmission line 18 by the optical coupler 17.

The optical network system 1 according to the present embodiment comprises the wavelength conversion apparatus 16 having the same configuration as that of the above-mentioned wavelength conversion apparatus according to the first embodiment or the second embodiment. The wavelength conversion apparatus 16 allows the light signals which differ in wavelength to be multiplexed to light signals having a predetermined wavelength. The light signals outputted from the wavelength conversion apparatus 17 may be returned to the optical transmission line $11_n$ between the optical switch $12_n$ and the first optical multiplexer 13.

Second Embodiment of Optical Network System

The above-mentioned wavelength conversion apparatuses 100 and 200 according to the first and second embodiments are characterized by carrying out wavelength-conversion such that an optical frequency (wavelength) of output light does not depend on that of input light. For example, in the wavelength conversion apparatus 100 according to the first embodiment, the first wavelength converter 110 generates FWM from the input light and a first pumping light, and outputs an intermediate light and the input light generated from the FWM. Subsequently, the second wavelength converter 120 generates FWM from a second pumping light together with the input light and the intermediate light outputted form the first wavelength converter 110, and outputs a second intermediate light (output light) generated from the FWM.

As can be seen from this matter, it is clear that any light signals (wavelength components) can be converted to a specific wavelength by using the wavelength conversion apparatuses 100 and 200, when the input signals (input light) are WDM signals that light signals in a plurality of channels with wavelengths different from each other are multiplexed. The example using this feature has been explained as an example that a wavelength resource can be effectively used by converting burst signals with different wavelengths into a specific single wavelength (see FIG. 12).

However, the wavelength conversion apparatuses 100 and 200 are useful to CW signals propagating in a steady manner instead of burst signals. FIG. 17 shows an example that the wavelength-conversion is carried out to pulse signal sequences in a plurality of channels with different wavelengths. The area (a) in FIG. 17 shows, similar to the (a) in FIG. 12, an arrangement relationship among input light signals with optical frequencies of $f_{01}$, $f_{02}$, $f_{03}$ and $f_{04}$, output signals with an optical frequency of $f_2$, and pumping light components with optical frequencies of $f_{pump1}$ and $f_{pump2}$.

The signals in channels (with optical frequencies of $f_{01}$, $f_{02}$, $f_{03}$ and $f_{04}$), as shown in the area (b) in FIG. 17, have a specific bit rate, and are burst signals with a narrower width than one bit period ($T_b$) determined by the bit rate. These input signals are timing-adjusted so as not to overlap each other along a time-line before WDM multiplexing. After performing WDM multiplexing under this condition, these input signals are wavelength-converted by the wavelength conversion apparatuses 100 and 200. At this time, since all converted pulses are arranged in on one time-line (output signals with the optical frequency $f_2$ shown in the area (b) in FIG. 17), it can be seen that WDM signals are converted into TDM signals.

The above explanation is directed to an example that this invention is applied to four-channel WDM signal, but the number of signal channels is not limited if the number is two or more. Additionally, in FIG. 17, the bit rates in all signal channels are same, but the condition that bit rates of signal channels are different from each other is allowed if the periods of all pulse sequences satisfy the relationship such that each of these periods is the integral multiple of a specific value.

Figure 18:
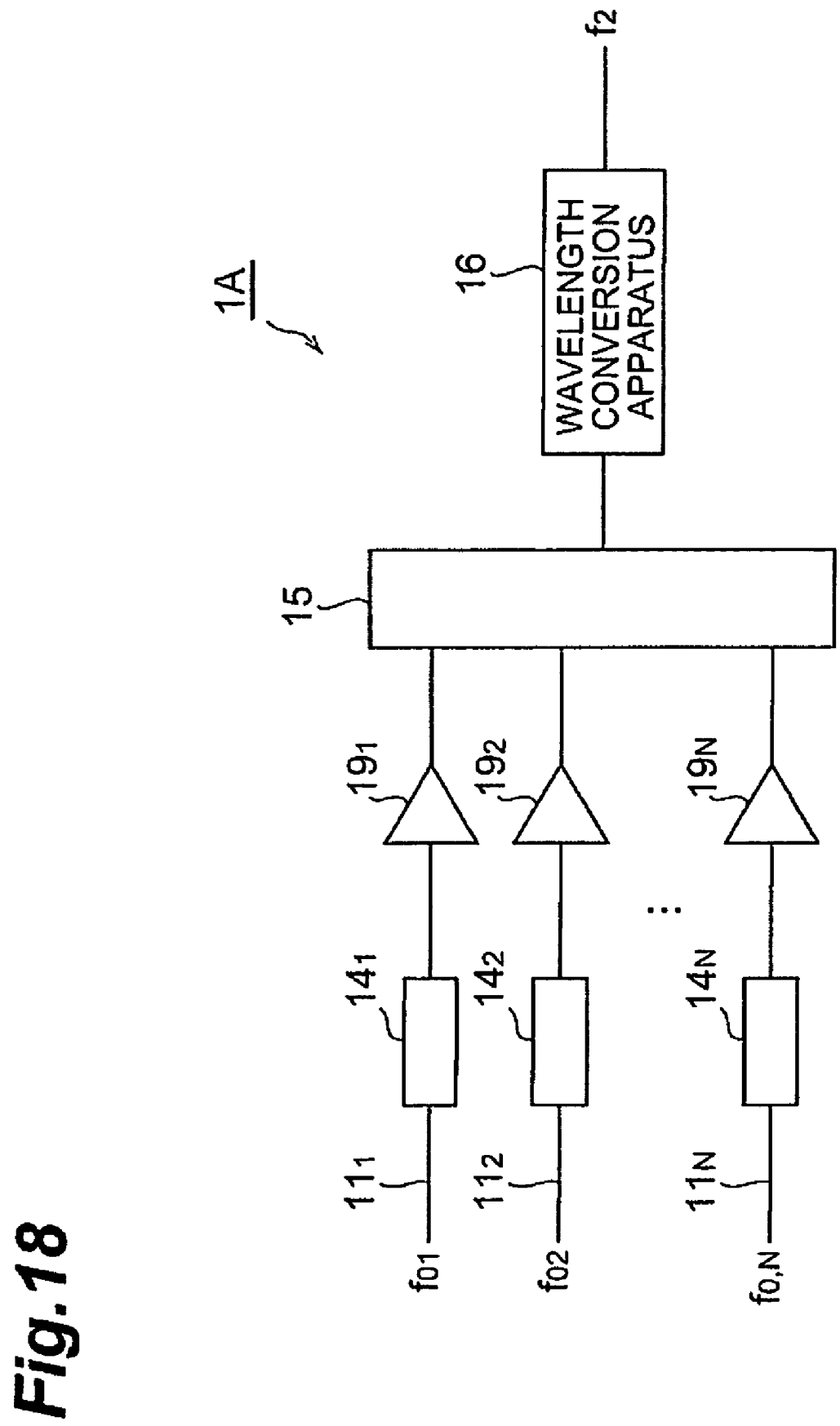
FIG. 18 is a diagram showing a configuration of a second embodiment of an optical network system according to the present invention.

Such a wavelength conversion from WDM signals to TDM signals can be achieved by an optical network system having a configuration shown in FIG. 18. FIG. 18 shows a configuration of a second embodiment of an optical network system according to the present invention. The optical network system 1A according to the second embodiment comprises N optical transmission lines $11_1$ to $11_N$ through which signals in a plurality of channels propagate, N optical delay units $14_1$ to $14_N$, N optical amplifiers $19_1$ to $19_N$, an optical multiplexer 15, and a wavelength conversion apparatus 16. Any one of the wavelength conversion apparatuses 100 and 200 according to the first and second embodiments can be applied to the wavelength conversion apparatus 16.

In the optical network system 1A according to the second embodiment, the signal pulse sequences propagating through the N optical transmission lines $11_1$ to $11_N$ are timing-adjusted so as not to overlap each other. Thereafter, the timing-adjusted signals are multiplexed by the optical multiplexer 15 and the multiplexed signals (WDM signals) are converted into TDM signals by the wavelength conversion apparatus 16. Between the optical delay units $14_1$ to $14_N$ and the optical multiplexer 15, the optical amplifiers $19_1$ to $19_N$ are arranged in order to increase the power of each signal before the multiplexed signals reach the wavelength conversion apparatus 16. The optical amplifier may be arranged between the optical multiplexer 15 and the wavelength conversion apparatus 16. In particular, as shown in FIG. 18, at the case that the optical amplifiers $19_1$ to $19_N$ are arranged just before the optical multiplexer 15, optical noise generated in the optical amplifiers $19_1$ to $19_N$ is preferably removed by the optical multiplexer 15. Furthermore, an optical fiber with a shot length can be applied because the pulse width of each signal should be narrow such that signals do not overlap each other.

As described above, the conversion from WDM signals to TDM signals can effectively use a wavelength resource because signals with a comparatively low bit rate from a terminal are transmitted into a trunk network after them collected into one signal channel. Such a technology may turns into an important technology in the feature. However, in the case of wavelength conversion for signals with a very high bit rate such as 160 Gbit/s, a high-speed signal generation by using an electric means is impossible and therefore a signal generation by using an optical means is effective.

As an example of WDM/TDM conversion to all signal channels, some technologies are reported. One of them is a converting method obtaining TDM signals by cutting the overlapping portion with a filter, after expanding the spectra of signals so as for them to overlap each other by the generated supercontinuum. This method is disclosed in Document 1, but a filter to be used should be changed in accordance with signal characteristics because the signal waveform after converting depends on the characteristics of the cutting filter.

Furthermore, as the other method, a method, using a phenomenon such that the waveforms of WDM signals are copied to CW light by introducing CW light with a specific wavelength together with pulse WDM signals onto a medium whose absorption coefficient decreases in accordance with the intensity of input light, can be considered. This method is disclosed in Document 2, but a signal waveform is easily deteriorated when a high speed TDM signal conversion is carried out because a saturated absorption due to electric carrier is used, the upper limit of response speed is restricted.

In the wavelength conversion apparatus according to the present invention, the filter is prepared so as to cut only undesirable signals, and therefore the filter does not affect a signal waveform while maintaining a filter band be widely enough with respect to a signal width, as compared with these Documents 1 and 2. Also, since the TDM signals can be generated without using an electric means, there is no electrical restriction.

Furthermore, the light signals with a very high bit rate such as 160 Gbit/s have a very low dispersion tolerance. In addition, it can be considered that a waveform of each light signal distorts due to a small chromatic dispersion while remaining a chirp in each light signal. In contrast, the wavelength conversion apparatus according to the present invention has an effect to compensate for the chirp, and therefore can generate TDM signals with a comparatively high dispersion tolerance.

First Embodiment of Optical Transmission System

Figure 19:
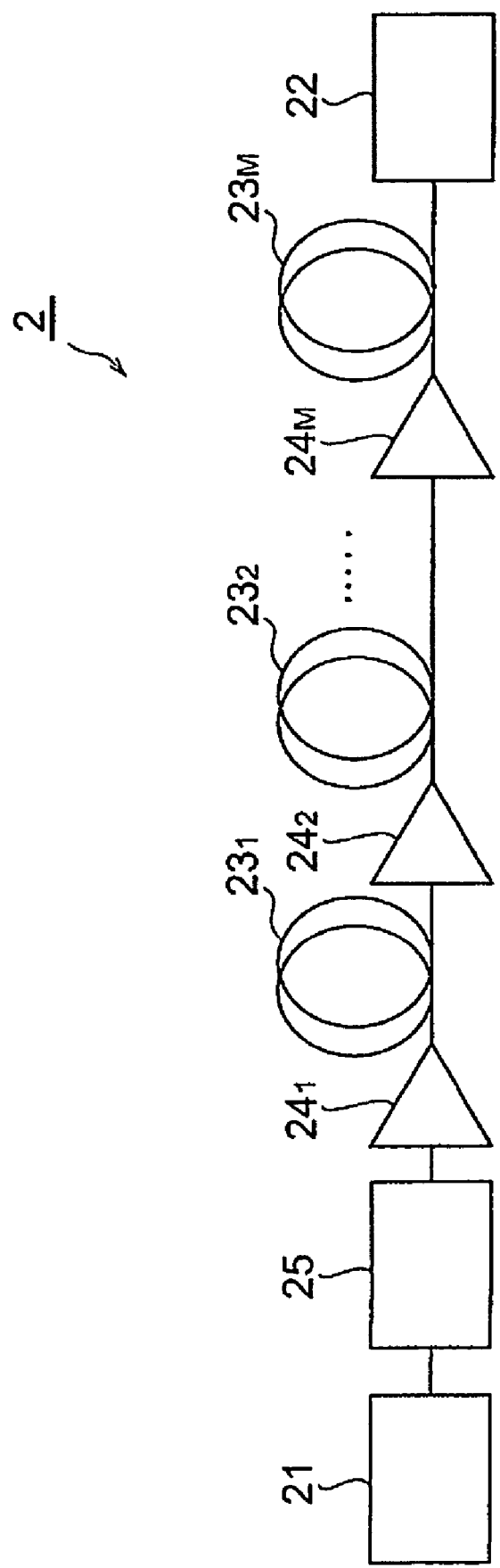
FIG. 19 is a diagram showing a configuration of a first embodiment of an optical transmission system according to the present invention.

A first embodiment of an optical transmission system according to the present invention will be then described. FIG. 19 is a diagram showing a configuration of a first embodiment of an optical transmission system according to the present invention. The optical transmission system 2 shown in FIG. 19 comprises optical transmission lines $23_1$ to $23_M$, optical amplifiers $24_1$ to $24_M$, and a wavelength conversion apparatus 25 between an optical transmitter 21 and an optical receiver 22. M is an integer of not less than 2. Used as the wavelength conversion apparatus 25 is the above-mentioned wavelength conversion apparatus according to the first embodiment or the second embodiment.

Light signals outputted from the optical transmitter 21 are outputted after being wavelength-converted by the wavelength conversion apparatus 25 provided just behind the optical transmitter 21. The light signals outputted from the wavelength conversion apparatus 25 are transmitted through the optical transmission lines $23_1$ to $23_M$, and is optically amplified by the optical amplifiers $24_1$ to $24_M$ provided halfway in the optical transmission lines, to reach the optical receiver 22. The optical receiver 22 receives the light signals.

As described above, the wavelength conversion apparatus 25 can compensate for the chirp of each light signal outputted from the optical transmitter 21 and shape the waveform thereof. From the foregoing, even in a case where the chirp of each light signal outputted from the optical transmitter 21 is large or the extinction ratio thereof is low, for example, a case where a DML is used for the optical transmitter 21, each light signal outputted from the wavelength conversion apparatus 25 is one which has been chirp-compensated and waveform-shaped. In the optical transmission system 2 according to the present embodiment, therefore, the transmission distance of the light signals can be extended.

Second Embodiment of Optical Transmission System

Figure 20:
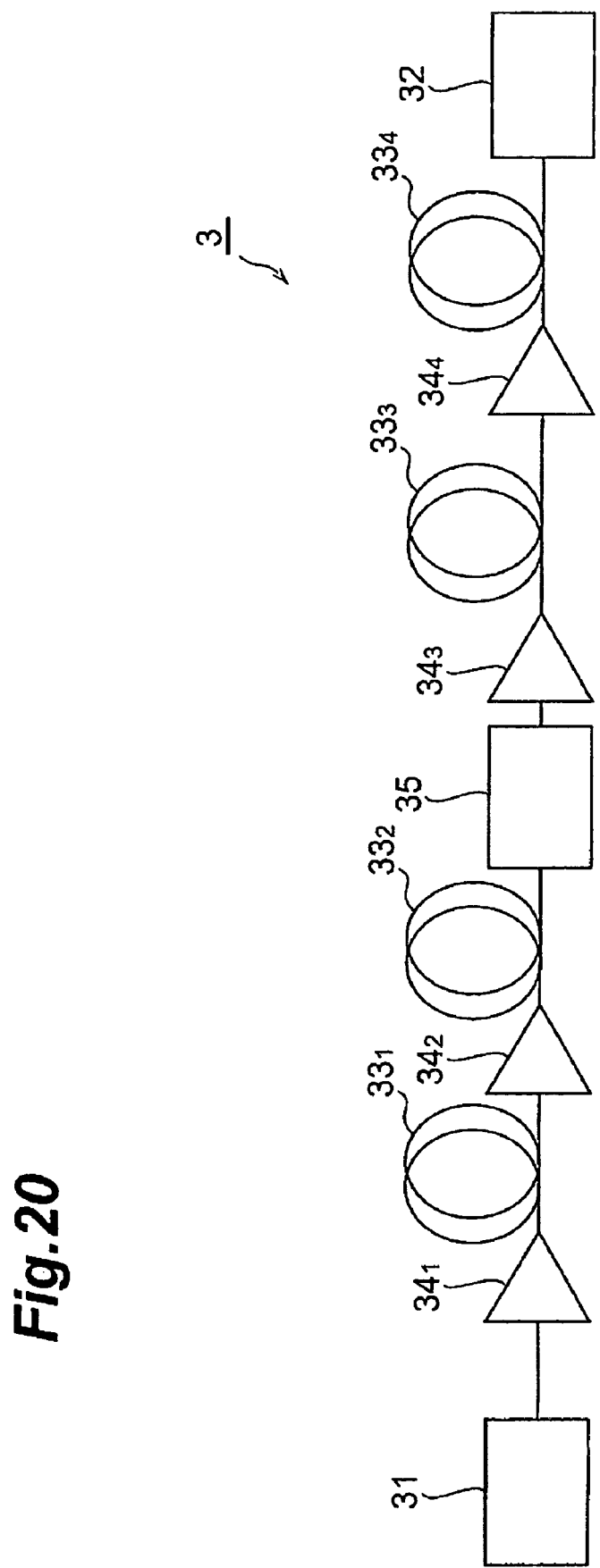
FIG. 20 is a diagram showing a configuration of a second embodiment of an optical transmission system according to the present invention.

A second embodiment of an optical transmission system according to the present invention will be then described. FIG. 20 is a diagram showing a configuration of a second embodiment of an optical transmission system according to the present invention. The optical transmission system 3 shown in FIG. 20 comprises optical transmission lines $33_1$ to $33_4$, optical amplifiers $34_1$ to $34_4$, and a wavelength conversion apparatus 35 between an optical transmitter 31 and an optical receiver 32. Used as the wavelength conversion apparatus 35 is the above-mentioned wavelength conversion apparatus according to the first embodiment or the second embodiment.

Light signals outputted from the optical transmitter 31 are transmitted through the optical transmission lines $33_1$ to $33_4$, and are optically amplified by the optical amplifiers $34_1$ to $34_4$ provided halfway in the optical transmission lines, to reach the optical receiver 32. The optical receiver 23 receives the light signals. The light signals transmitted to the optical receiver 32 from the optical transmitter 31 is wavelength-converted by the wavelength conversion apparatus 35 provided halfway in the optical transmission lines between the optical transmitter 31 and the optical receiver 32.

As described above, the wavelength conversion apparatus 35 can compensate for the chirp of each light signal transmitted through the optical transmission lines and shape the waveform thereof. From the foregoing, even in a case where the chirp of each transmitted light signal is large or the extinction ratio thereof is low, for example, a case where a DML is used for the optical transmitter 31, or in a case where a nonlinear effect (e.g., SPM or XPM) is produced halfway within the transmission line so that a chirp is generated even when an external modulator is used for the optical transmitter 31, each light signal outputted from the wavelength conversion apparatus 35 is one which has been chirp-compensated and waveform-shaped. In the optical transmission system 3 according to the second embodiment, therefore, the transmission distance of the light signals can be extended.

The chirp of each light signal is generally a factor for causing waveform degradation due to chromatic dispersion in the optical transmission lines. When the chromatic dispersion in the optical transmission lines is negative, however, the waveform of each light signal is sharpened, which may contribute to improvement in receiving sensitivity in the optical receiver 32. Even when the chromatic dispersion in the optical transmission lines is negative, however, the waveform of each light signal is rather degraded if the absolute value of the chromatic dispersion is too large.

Therefore, it is assumed that the chromatic dispersion in the optical transmission lines $33_1$ and $33_2$ between the optical transmitter 31 and the wavelength conversion apparatus 35 is negative. When the chirp of each light signal is suitably improved by the optical transmission lines $33_1$ and $33_2$, and the chirp of each light signal is then removed by the wavelength conversion apparatus 35, degradation in the waveform of each light signal can be restrained, so that the transmission distance of the light signals can be extended.

Figure 21:
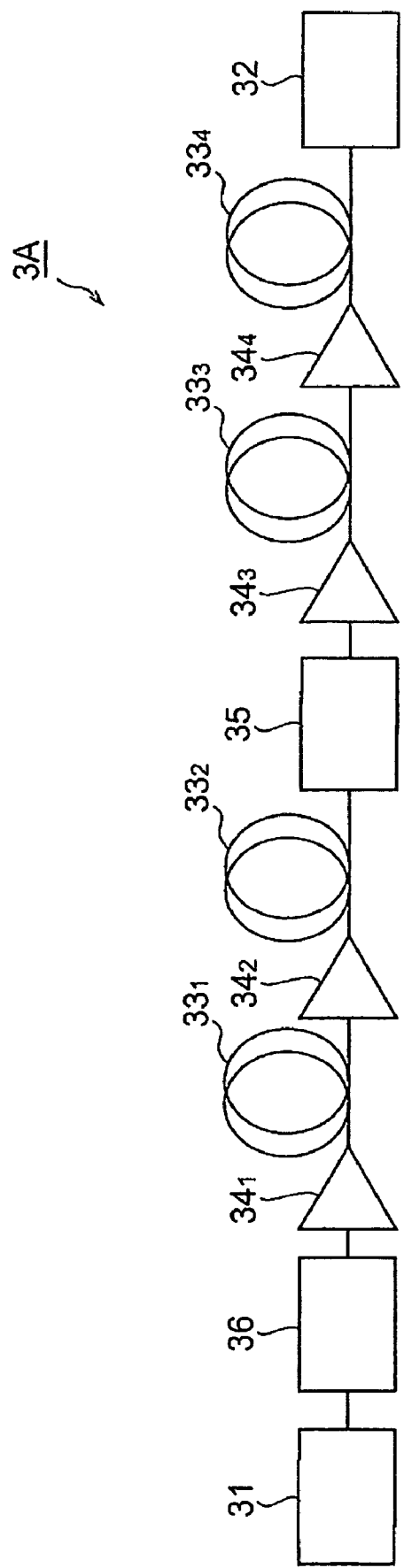
FIG. 21 is a diagram showing the configuration of a modified example of the optical transmission system according to the second embodiment.

In order to restrain the waveform degradation of the light signals due to the nonlinear optical phenomenon, a chirp may be intentionally given to each light signal by a phase modulator 36 provided just behind the optical transmitter 31, as in an optical transmission system 3A shown in FIG. 21. Also in this case, when the chirp of each light signal is suitably improved by the optical transmission lines $33_1$ and $33_2$, and the chirp of each light signal is then removed by the wavelength conversion apparatus 35, degradation in the waveform of each light signal can be restrained, so that the transmission distance of the light signals can be extended.

Specific Example of Wavelength Conversion Apparatus

Figure 22:
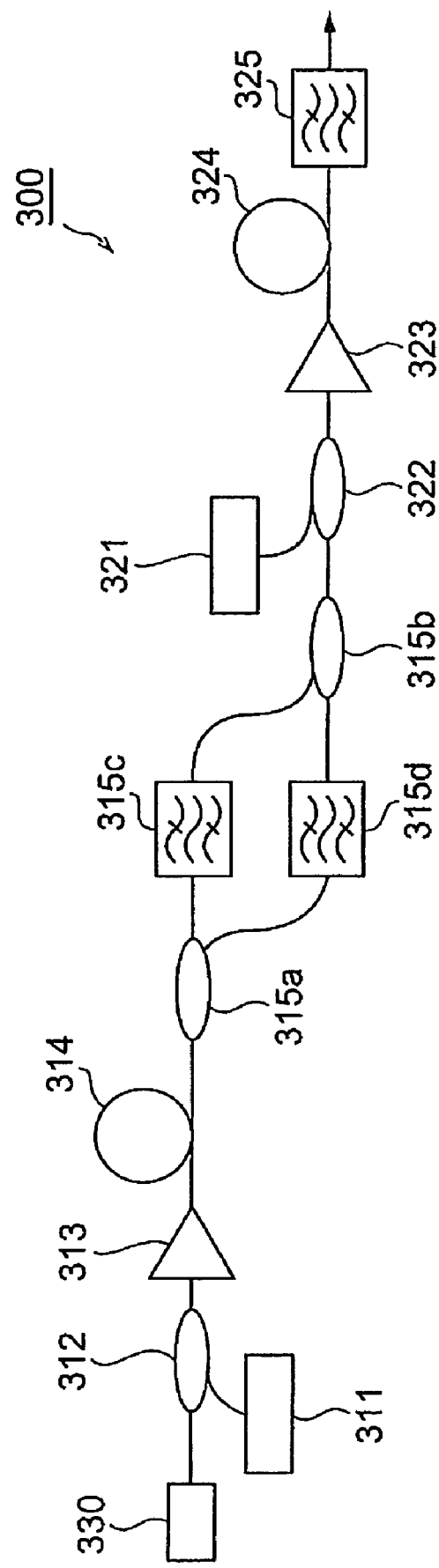
FIG. 22 is a diagram showing a concrete configuration of a wavelength conversion apparatus according to the present invention.

Next, a more specific example of the waveform conversion apparatus according to the present invention will be then described. FIG. 22 is a diagram showing a configuration of a wavelength conversion apparatus 300 in this example. The wavelength conversion apparatus 300 in this example is the same as the configuration of the above-mentioned wavelength conversion apparatus 100 according to the first embodiment. The wavelength conversion apparatus 300 is used together with a signal light source 330. The signal light source 330 comprises a direct modulation-driven laser diode of 2.5 Gb/s, and outputs a light signal having an optical frequency $f_0$ of 193.4 THz.

The wavelength conversion apparatus 300 comprises, as elements constituting the above-mentioned first wavelength converter, a first pumping light source 311, a first optical coupler 312, a first optical amplifier 313, a first nonlinear optical medium 314, optical couplers 315a and 315b, and optical filters 315c and 315d.

The first pumping light source 311 outputs first pumping light having an optical frequency $f_{pump1}$ of 193.8 THz. The first optical coupler 312 receives light signal outputted from the signal light source 330 and receives the first pumping light outputted from the first pumping light source 311, to couple the light signal and the first pumping light, and output the coupled light. The first optical amplifier 313 receives the light signal and the first pumping light which are outputted after being coupled by the first optical coupler 312, to optically amplify the light signal and the first pumping light, and output the optically amplified lights as output light power 17 dBm.

The first nonlinear optical medium 314 receives the light signal and the first pumping light which are outputted after being optically amplified by the first optical amplifier 313, to generate FWM by the light signal and the first pumping light, and generate intermediate light having an optical frequency $f_1$ of 194.2 THz by FWM. A highly nonlinear optical fiber having a length of 500 m is used as the first nonlinear optical medium 314.

The optical couplers 315a and 315b and the optical filters 315c and 315d constitute a first optical filter. The optical coupler 315a branches the light outputted from the first nonlinear optical medium 314 into two light components, and outputs one of the two light components to the optical filter 315c, while outputting the other light to the optical filter 315d. The optical filter 315c selectively transmits the light signal having the optical frequency $f_0$ out of the light components transmitted from the optical coupler 315a. The optical filter 315d selectively transmits the intermediate light having the optical frequency $f_1$ out of the light components transmitted from the optical coupler 315a. The transmission bandwidth of the optical filters 315c and 315d is 75 GHz, and the transmission properties thereof are approximated by a 2nd super-Gaussian function. The optical coupler 315b receives the light signal transmitted through the optical filter 315c and receives the intermediate light transmitted through the optical filter 315d, to couple the light signal and the intermediate light, and output the coupled light components.

The wavelength conversion apparatus 300 comprises, as elements constituting the above-mentioned second wavelength converter, a second pumping light source 321, a second optical coupler 322, a second optical amplifier 323, a second nonlinear optical medium 324, and a second optical filter 325.

The second pumping light source 321 outputs second pumping light having an optical frequency $f_{pump2}$ of 194.0 THz. The second optical coupler 322 receives the intermediate light and the light signal which are outputted from the optical coupler 315b and receives the second pumping light outputted from the second pumping light source 321, to couple the intermediate light, the light signal, and the second pumping light, and output the coupled light components. The second optical amplifier 323 receives the intermediate light, the light signal, and the second pumping light which are outputted after being coupled by the second optical coupler 322, to optically amplify the intermediate light, the light signal, and the second pumping light, and output the optically amplified light as output light power 15 dBm.

The second nonlinear optical medium 324 receives the intermediate light, the light signal, and the second pumping light which are outputted after being optically amplified by the second optical amplifier 323, to generate FWM by the intermediate light, the light signal, and the second pumping light, and generate output light having an optical frequency $f_2$ of 193.6 THz by the FWM. A highly nonlinear optical fiber having a length of 500 m is used as the second nonlinear optical medium 324. The second optical filter 325 selectively transmits and outputs the output light out of the lights outputted from the second nonlinear optical medium 324. The transmission bandwidth of the second optical filter 325 is 75 GHz, and the transmission properties thereof are approximated by a 2nd super-Gaussian function.

FIG. 23 is a diagram showing an optical spectrum in the wavelength conversion apparatus 300 shown in FIG. 22. The area (a) in FIG. 23 shows the spectrum of light outputted from the first nonlinear optical medium 314. The area (b) in FIG. 23 shows the spectrum of light outputted from the second nonlinear optical medium 324. As shown in FIG. 23, the light outputted from the first nonlinear optical medium 314 comprises an intermediate light component having an optical frequency $f_1$ in addition to a signal light component having an optical frequency $f_0$ and a first pumping light component having an optical frequency $f_{pump1}$. On the other hand, the light outputted from the second nonlinear optical medium 324 comprises an output light component having an optical frequency $f_2$ in addition to a signal light component having an optical frequency $f_0$, an intermediate light component having an optical frequency $f_1$, and a second pumping light component having an optical frequency $f_{pump2}$.

FIGS. 24 to 26 are diagrams showing the waveform (intensity) of each of the light components and variations in the optical frequency of the light in the wavelength conversion apparatus 300 in this example. In FIG. 24, the area (a) shows the waveform (intensity) of light signal having an optical frequency $f_0$ outputted from the signal light source 330, and the area (b) shows variations in the optical frequency thereof. In FIG. 25, the area (a) shows the waveform (intensity) of intermediate light having an optical frequency $f_1$ outputted from the optical filter 315d, and the area (b) shows variations in the optical frequency thereof. In FIG. 26, the area (a) shows the waveform (intensity) of output light having an optical frequency $f_2$ outputted from the second optical filter 325, and the area (b) shows variations in the optical frequency thereof. As shown in FIGS. 24 to 26, the extinction ratio of the light signal outputted from the signal light source 330 is 7.5 dB, so that both a transient chirp and an adiabatic chirp are recognized. The extinction ratio of the intermediate light is approximately the same as that of the light signal, while the chirp thereof is the reverse of the chirp of each light signal. The extinction ratio of the output light is improved because the low level of intensity is reduced, and the adiabatic chirp thereof is restrained.

FIG. 27 is a diagram showing eye patterns of signals after transmission in the optical transmission system using the wavelength conversion apparatus 300 shown in FIG. 22. In FIG. 27, the area (a) shows the eye pattern of light obtained after light signal outputted from a DML is directly transmitted through a SMF having a length of 150 km without using the wavelength conversion apparatus 300. The area (b) shows the eye pattern of light obtained after light signal outputted from a DML is transmitted through a SMF having a length of 150 km after being wavelength-converted and chirp-compensated by the wavelength conversion apparatus 300. As can be seen from FIG. 27, when the chirp of each light signal is compensated for by the wavelength conversion apparatus 300, degradation in the waveform of the light which has been transmitted through the optical fiber having a length of 150 km is restrained.

As described above, in accordance with the wavelength conversion apparatus of the present invention, the wavelength of the output light can be made constant even when the wavelength of the input light is changed. Furthermore, the wavelength conversion apparatus according to the present invention can be suitably applied to optical network systems or optical transmission systems.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A wavelength conversion apparatus that generates output light having a wavelength different from a wavelength of input light and outputs the generated output light, comprising:

a first wavelength converter generating four-wave mixing by the input light and a first pumping light having a single wavelength, generating an intermediate light having a new wavelength by the four-wave mixing, and outputting the intermediate light and the input light; and a second wavelength converter generating four-wave mixing by the intermediate light and the input light, respectively outputted from said first wavelength converter, and a second pumping light, generating output light having a new wavelength by the four-wave mixing, and outputting the generated output light, wherein the wavelength of the output light is constant without depending on the wavelength of the input light.

2. A wavelength conversion apparatus that generates output light having a wavelength different from a wavelength of input light and outputs the generated output light, comprising:

a first wavelength converter generating four-wave mixing by the input light and a first pumping light having a single wavelength, generating an intermediate light having a new wavelength by the four-wave mixing, and outputting the intermediate light and the input light; and a second wavelength converter generating four-wave mixing by the intermediate light and the input light, respectively outputted from said first wavelength converter, and a second pumping light, generating output light having a new wavelength by the four-wave mixing, and outputting the generated output light, wherein variations in the optical frequency of the output light are smaller than variations in the optical frequency of the input light.

3. A wavelength conversion apparatus that generates output light having a wavelength different from a wavelength of input light and outputs the generated output light, comprising:

a first wavelength converter generating four-wave mixing by the input light and a first pumping light having a single wavelength, generating an intermediate light having a new wavelength by the four-wave mixing, and outputting the intermediate light and the input light; and a second wavelength converter generating four-wave mixing by the intermediate light and the input light, respectively outputted from said first wavelength converter, and a second pumping light, generating output light having a new wavelength by the four-wave mixing, and outputting the generated output light, wherein the extinction ratio of the output light is higher than the extinction ratio of the input light.

4. A wavelength conversion apparatus that generates output light having a wavelength different from a wavelength of input light and outputs the generated output light, comprising:

a first wavelength converter generating four-wave mixing by the input light and a first pumping light having a single wavelength, generating an intermediate light having a new wavelength by the four-wave mixing, and outputting the intermediate light and the input light; and a second wavelength converter generating four-wave mixing by the intermediate light and the input light, respectively outputted from said first wavelength converter, and a second pumping light, generating output light having a new wavelength by the four-wave mixing, and outputting the generated output light, wherein said wavelength conversion apparatus wavelength-converts light signals in a plurality of channels with wavelengths different from each other into light signals in an output channel with a predetermined wavelength, the light signals in the output channel being multiplexed without them overlapping each other along a time-line.

5. An optical network system comprising:

N (N is an integer or 2 or more) optical delay units inputting light signals included in a plurality of channels, which have wavelengths different from each other and in which each signal appears intermittently, and delaying the light signals in the plurality of channels to prevent overlapping each other along a time-line; and a wavelength conversion apparatus increasing a signal-existence probability in an output channel with a predetermined wavelength by wavelength-converting light signals in the plurality of channels, whose signal-occurrence timings are adjusted by said N optical delay units so as not to overlap each other along a time-line, into light signals in the output channel, said wavelength conversion apparatus comprising:

a first wavelength converter generating four-wave mixing by the input light and a first pumping light having a single wavelength, generating an intermediate light having a new wavelength by the four-wave mixing, and outputting the intermediate light and the input light; and a second wavelength converter generating four-wave mixing by the intermediate light and the input light, respectively outputted from said first wavelength converter, and a second pumping light, generating output light having a new wavelength by the four-wave mixing, and outputting the generated output light.

6. An optical network system comprising:

N (N is an integer or 2 or more) optical delay units inputting light signals included in a plurality of channels, which have wavelengths different from each other and in which each signal appears intermittently, and delaying the light signals in the plurality of channels to prevent overlapping each other along a time-line; and a wavelength conversion apparatus decreasing a signal-spacing in an output channel with a predetermined wavelength by wavelength-converting light signals in the plurality of channels, whose signal-occurrence timings are adjusted by said N optical delay units so as not to overlap each other along a time-line, into light signals in the output channel, said wavelength conversion apparatus comprising:

a first wavelength converter generating four-wave mixing by the input light and a first pumping light having a single wavelength, generating an intermediate light having a new wavelength by the four-wave mixing, and outputting the intermediate light and the input light; and a second wavelength converter generating four-wave mixing by the intermediate light and the input light, respectively outputted from said first wavelength converter, and a second pumping light, generating output light having a new wavelength by the four-wave mixing, and outputting the generated output light.

7. An optical network system comprising:

N (N is an integer of 2 or more) optical transmission lines;

N optical switches respectively provided halfway in said N optical transmission lines;

a first optical multiplexer receiving light signals respectively transmitted from said N optical switches, multiplexing the light signals, and outputting the multiplexed signals to a common transmission line;

N optical delay units, respectively provided in correspondence with said N optical switches, for delaying the light signals transmitted from said corresponding optical switches and outputting the delayed light signals;

a second optical multiplexer, receiving the light signals respectively outputted from said N optical delay units, for multiplexing the light signals and outputting the multiplexed signals;

a wavelength conversion apparatus wavelength-converting the multiplexed signals outputted from said second optical multiplexer, said wavelength conversion apparatus comprising:

a first wavelength converter generating four-wave mixing by the input light and a first pumping light having a single wavelength, generating an intermediate light having a new wavelength by the four-wave mixing, and outputting the intermediate light and the input light; and a second wavelength converter generating four-wave mixing by the intermediate light and the input light, respectively outputted from said first wavelength converter, and a second pumping light, generating output light having a new wavelength by the four-wave mixing, and outputting the generated output light; and signal returning means for returning the light signal outputted from said wavelength conversion apparatus to one of said N optical transmission lines between said N optical switches and said first optical multiplexer or to said common optical transmission line.

8. An optical network system comprising:
N (N is an integer of 2 or more) optical transmission lines;
N optical delay units, respectively provided halfway in said N optical transmission lines, for delaying the light signals propagating through said corresponding optical transmission lines and outputting the delayed light signals;
an optical multiplexer for multiplexing the light signals respectively outputted from said N optical delay units; and
a wavelength conversion apparatus for wavelength-converting the multiplexed signals outputted from said optical multiplexer, said wavelength conversion apparatus comprising:
a first wavelength converter generating four-wave mixing by the input light and a first pumping light having a single wavelength, generating an intermediate light having a new wavelength by the four-wave mixing, and outputting the intermediate light and the input light; and
a second wavelength converter generating four-wave mixing by the intermediate light and the input light, respectively outputted from said first wavelength converter, and a second pumping light, generating output light having a new wavelength by the four-wave mixing, and outputting the generated output light.

9. An optical transmission system comprising:
a signal source including at least an optical transmitter for generating light signals, said signal source having a structure for modulating at least one of intensity and phase of the light signals;
an optical transmission line for transmitting the modulated light signals from said signal source;
an optical receiver for receiving the modulated light signals transmitted through said optical transmission line; and
a wavelength conversion apparatus, provided just behind said signal source, for wavelength-converting the modulated light signals from said signal source, said wavelength conversion apparatus comprising:
a first wavelength converter generating four-wave mixing by the input light and a first pumping light having a single wavelength, generating an intermediate light having a new wavelength by the four-wave mixing, and outputting the intermediate light and the input light; and
a second wavelength converter generating four-wave mixing by the intermediate light and the input light, respectively outputted from said first wavelength converter, and a second pumping light, generating output light having a new wavelength by the four-wave mixing, and outputting the generated output light.

10. An optical transmission system comprising:
a signal source including at least an optical transmitter for generating light signals, said signal source having a structure for modulating at least one of intensity and phase of the light signals;
an optical transmission line for transmitting the modulated light signals from said signal source;
an optical receiver for receiving the modulated light signals transmitted through said optical transmission line; and
a wavelength conversion apparatus, provided halfway in said optical transmission line, for wavelength-converting the modulated light signals transmitted through said optical transmission line, said wavelength conversion apparatus comprising:
a first wavelength converter generating four-wave mixing by the input light and a first pumping light having a single wavelength, generating an intermediate light having a new wavelength by the four-wave mixing, and outputting the intermediate light and the input light; and
a second wavelength converter generating four-wave mixing by the intermediate light and the input light, respectively outputted from said first wavelength converter, and a second pumping light, generating output light having a new wavelength by the four-wave mixing, and outputting the generated output light.

11. A wavelength conversion apparatus that generates output light having a wavelength different from the wavelength of input light and outputs the generated output light, comprising:
a first wavelength converter generating four-wave mixing by the input light and a first pumping light having a plurality of wavelengths, generating a first intermediate light and a second intermediate light each having a new wavelength by the four-wave mixing, and outputting the generated first intermediate light and the second intermediate light; and
a second wavelength converter generating four-wave mixing by the first intermediate light and the second intermediate light, respectively outputted from said first wavelength converter, and a second pumping light, generating output light having a new wavelength by the four-wave mixing, and outputting the generated output light,
wherein the wavelength of the output light is constant without depending on the wavelength of the input light.

12. A wavelength conversion apparatus that generates output light having a wavelength different from the wavelength of input light and outputs the generated output light, comprising:
a first wavelength converter generating four-wave mixing by the input light and a first pumping light having a plurality of wavelengths, generating a first intermediate light and a second intermediate light each having a new wavelength by the four-wave mixing, and outputting the generated first intermediate light and the second intermediate light; and
a second wavelength converter generating four-wave mixing by the first intermediate light and the second intermediate light, respectively outputted from said first wavelength converter, and a second pumping light, generating output light having a new wavelength by the four-wave mixing, and outputting the generated output light,
wherein variations in the optical frequency of the output light are smaller than variations in the optical frequency of the input light.

13. A wavelength conversion apparatus that generates output light having a wavelength different from the wavelength of input light and outputs the generated output light, comprising:
a first wavelength converter generating four-wave mixing by the input light and a first pumping light having a plurality of wavelengths, generating a first intermediate light and a second intermediate light each having a new wavelength by the four-wave mixing, and outputting the generated first intermediate light and the second intermediate light; and a second wavelength converter generating four-wave mixing by the first intermediate light and the second intermediate light, respectively outputted from said first wavelength converter, and a second pumping light, generating output light having a new wavelength by the four-wave mixing, and outputting the generated output light, wherein the extinction ratio of the output light is higher than the extinction ratio of the input light.

14. A wavelength conversion apparatus that generates output light having a wavelength different from the wavelength of input light and outputs the generated output light, comprising:

a first wavelength converter generating four-wave mixing by the input light and a first pumping light having a plurality of wavelengths, generating a first intermediate light and a second intermediate light each having a new wavelength by the four-wave mixing, and outputting the generated first intermediate light and the second intermediate light; and a second wavelength converter generating four-wave mixing by the first intermediate light and the second intermediate light, respectively outputted from said first wavelength converter, and a second pumping light, generating output light having a new wavelength by the four-wave mixing, and outputting the generated output light, wherein said wavelength conversion apparatus wavelength-converts light signals in a plurality of channels with wavelengths different from each other into light signals in an output channel with a predetermined wavelength, the signals in the output channel being multiplexed without them overlapping each other along a time-line.

15. An optical network system comprising:

N (N is an integer or 2 or more) optical delay units inputting light signals included in a plurality of channels, which have wavelengths different from each other and in which each signal appears intermittently, and delaying the light signals in the plurality of channels to prevent overlapping each other along a time-line; and a wavelength conversion apparatus increasing a signal-existence probability in an output channel with a predetermined wavelength by wavelength-converting light signals in the plurality of channels, whose signal-occurrence timings are adjusted by said N optical delay units so as not to overlap each other along a time-line, into light signals in the output channel, said wavelength conversion apparatus comprising:

a first wavelength converter generating four-wave mixing by the input light and a first pumping light having a plurality of wavelengths, generating a first intermediate light and a second intermediate light each having a new wavelength by the four-wave mixing, and outputting the generated first intermediate light and the second intermediate light; and a second wavelength converter generating four-wave mixing by the first intermediate light and the second intermediate light, respectively outputted from said first wavelength converter, and a second pumping light, generating output light having a new wavelength by the four-wave mixing, and outputting the generated output light.

16. An optical network system comprising:

N (N is an integer of 2 or more) optical delay units inputting light signals included in a plurality of channels, which have wavelengths different from each other and in which each signal appears intermittently, and delaying the light signals in the plurality of channels to prevent overlapping each other along a time-line; and a wavelength conversion apparatus decreasing a signal-spacing in an output channel with a predetermined wavelength by wavelength-converting light signals in the plurality of channels, whose signal-occurrence timings are adjusted by said N optical delay units so as not to overlap each other along a time-line, into light signals in the output channel, said wavelength conversion apparatus comprising:

a first wavelength converter generating four-wave mixing by the input light and a first pumping light having a plurality of wavelengths, generating a first intermediate light and a second intermediate light each having a new wavelength by the four-wave mixing, and outputting the generated first intermediate light and the second intermediate light; and a second wavelength converter generating four-wave mixing by the first intermediate light and the second intermediate light, respectively outputted from said first wavelength converter, and a second pumping light, generating output light having a new wavelength by the four-wave mixing, and outputting the generated output light.

17. An optical network system comprising:

N (N is an integer of 2 or more) optical transmission lines;

N optical switches respectively provided halfway in said N optical transmission lines;

a first optical multiplexer, receiving light signals respectively transmitted from said N optical switches, for multiplexing the light signals and outputting the multiplexed signals to a common transmission line;

N optical delay units, respectively provided in correspondence with said N optical switches, for delaying the light signals transmitted from said corresponding optical switches and outputting the delayed light signals;

a second optical multiplexer, receiving the light signals respectively outputted from said N optical delay units, for multiplexing the light signals and outputting the multiplexed signals;

a wavelength conversion apparatus for wavelength-converting the multiplexed signals outputted from said second optical multiplexer, said wavelength conversion apparatus comprising:

a first wavelength converter generating four-wave mixing by the input light and a first pumping light having a plurality of wavelengths, generating a first intermediate light and a second intermediate light each having a new wavelength by the four-wave mixing, and outputting the generated first intermediate light and the second intermediate light; and a second wavelength converter generating four-wave mixing by the first intermediate light and the second intermediate light, respectively outputted from said first wavelength converter, and a second pumping light, generating output light having a new wavelength by the four-wave mixing, and outputting the generated output light; and signal returning means for returning the light signals outputted from said wavelength conversion apparatus to one of said N optical transmission lines between said N optical switches and said first optical multiplexer or to said common optical transmission line.

18. An optical network system comprising:

N (N is an integer of 2 or more) optical transmission lines;

N optical delay units, respectively provided halfway in said N optical transmission lines, for delaying the light signals propagating through said corresponding optical transmission lines and outputting the delayed light signals;

an optical multiplexer for multiplexing the light signals respectively outputted from said N optical delay units; and a wavelength conversion apparatus for wavelength-converting the multiplexed signals outputted from said optical multiplexer, said wavelength conversion apparatus comprising:

a first wavelength converter generating four-wave mixing by the input light and a first pumping light having a plurality of wavelengths, generating a first intermediate light and a second intermediate light each having a new wavelength by the four-wave mixing, and outputting the generated first intermediate light and the second intermediate light; and a second wavelength converter generating four-wave mixing by the first intermediate light and the second intermediate light, respectively outputted from said first wavelength converter, and a second pumping light, generating output light having a new wavelength by the four-wave mixing, and outputting the generated output light.

19. An optical transmission system comprising:

a signal source including at least an optical transmitter for generating light signals, said signal source having a structure for modulating at least one of intensity and phase of the light signals;

an optical transmission line for transmitting the modulated light signals from said signal source;

an optical receiver for receiving the modulated light signals transmitted through the optical transmission line; and a wavelength conversion apparatus, provided just behind said signal source, for wavelength-converting the modulated light signals from said signal source, said wavelength conversion apparatus comprising:

a first wavelength converter generating four-wave mixing by the input light and a first pumping light having a plurality of wavelengths, generating a first intermediate light and a second intermediate light each having a new wavelength by the four-wave mixing, and outputting the generated first intermediate light and the second intermediate light; and a second wavelength converter generating four-wave mixing by the first intermediate light and the second intermediate light, respectively outputted from said first wavelength converter, and a second pumping light, generating output light having a new wavelength by the four-wave mixing, and outputting the generated output light.

20. An optical transmission system comprising:

a signal source including at least an optical transmitter for generating light signals, said signal source having a structure for modulating at least one of intensity and phase of the light signals;

an optical transmission line for transmitting the modulated light signals from said signal source;

an optical receiver for receiving the modulated light signals transmitted through said optical transmission line; and a wavelength conversion apparatus, provided halfway in said optical transmission line, for wavelength-converting the modulated light signals transmitted through said optical transmission line, said wavelength conversion apparatus comprising:

a first wavelength converter generating four-wave mixing by the input light and a first pumping light having a plurality of wavelengths, generating a first intermediate light and a second intermediate light each having a new wavelength by the four-wave mixing, and outputting the generated first intermediate light and the second intermediate light; and a second wavelength converter generating four-wave mixing by the first intermediate light and the second intermediate light, respectively outputted from said first wavelength converter, and a second pumping light, generating output light having a new wavelength by the four-wave mixing, and outputting the generated output light.

* * * * *